(12) United States Patent
Arfaei Malekzadeh et al.

(10) Patent No.: US 10,418,707 B2
(45) Date of Patent: Sep. 17, 2019

(54) PLANAR END FIRE ANTENNA FOR WIDEBAND LOW FORM FACTOR APPLICATIONS

(71) Applicant: Skyworks Solutions, Inc., Woburn, MA (US)

(72) Inventors: Foad Arfaei Malekzadeh, Ottawa (CA); Stephen Joseph Kovacic, Ottawa (CA); Abdulhadi Ebrahim Abdulhadi, Ottawa (CA); Dinhphuoc Vu Hoang, Anaheim, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 39 days.

(21) Appl. No.: 15/690,930

(22) Filed: Aug. 30, 2017

(65) Prior Publication Data

US 2018/0069324 A1 Mar. 8, 2018

Related U.S. Application Data

(60) Provisional application No. 62/457,435, filed on Feb. 10, 2017, provisional application No. 62/383,996, filed on Sep. 6, 2016.

(51) Int. Cl.
*H01Q 21/00* (2006.01)
*H01Q 9/04* (2006.01)
(Continued)

(52) U.S. Cl.
CPC .......... *H01Q 9/0407* (2013.01); *H01Q 1/241* (2013.01); *H01Q 1/242* (2013.01); *H01Q 1/38* (2013.01);
(Continued)

(58) Field of Classification Search
CPC ........ H01Q 21/28; H01Q 5/341; H01Q 5/321; H01Q 5/335; H01Q 5/50
(Continued)

(56) References Cited

U.S. PATENT DOCUMENTS 8,760,352 B2 6/2014 Rao et al.
2007/0290941 A1* 12/2007 Brown .................. G01V 15/00
343/842
(Continued)

FOREIGN PATENT DOCUMENTS

CN 107069208 A 8/2017
CN 206774674 U 12/2017

OTHER PUBLICATIONS

Suga, et al., *Cost-Effective 60-GHz Antenna Package With End-Fire Radiation for Wireless File-Transfer System*, IEEE Transactions on Microwave Theory and Techniques, vol. 58, No. 12, Dec. 2010, 7 pp.

*Primary Examiner* — Joseph J Lauture
(74) *Attorney, Agent, or Firm* — Knobbe, Martens, Olson & Bear LLP

(57) ABSTRACT

An end-fire antenna for wideband low form factor applications includes a first metal layer, a second metal layer, and a dielectric layer disposed between the first and second metal layers. An open cavity formed in the dielectric layer that is filled with air, the cavity defined by a pair of sidewalls that extend from an aperture of the cavity to a rear wall of the cavity, where the depth of the aperture is defined between the aperture and the rear wall. The cavity is formed by selecting the width of the aperture of the cavity and the depth of the cavity such that the antenna achieves the same gain during operation irrespective of a variation in the thickness of the antenna.

30 Claims, 19 Drawing Sheets

(51) Int. Cl.
*H01Q 1/38* (2006.01)
*H01Q 1/24* (2006.01)
*H01Q 21/06* (2006.01)
*H01Q 13/02* (2006.01)
*H01Q 13/06* (2006.01)
*H01Q 19/08* (2006.01)
*H04B 1/38* (2015.01)

(52) U.S. Cl.
CPC ............. *H01Q 13/02* (2013.01); *H01Q 13/06* (2013.01); *H01Q 19/08* (2013.01); *H01Q 21/067* (2013.01); *H01Q 1/243* (2013.01); *H04B 1/38* (2013.01)

(58) Field of Classification Search
USPC ........ 343/893, 770, 842, 851, 817, 796, 786
See application file for complete search history.

(56) References Cited

U.S. PATENT DOCUMENTS

| | | |
|---|---|---|
| 2014/0285289 A1 | 9/2014 | Herbsommer |
| 2016/0056544 A1 | 2/2016 | Garcia |
| 2016/0164186 A1 | 6/2016 | Ganchrow |

\* cited by examiner

PLANAR END FIRE ANTENNA FOR WIDEBAND LOW FORM FACTOR APPLICATIONS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

Embodiments of the invention relate to electronic systems, and in particular, to radio frequency (RF) electronics.

Description of the Related Art

Radio communication above 20 GHz is primarily line of sight communication. End fire antennae are used to provide end fire patterns for end to end link between electronic devices, for example in file transfer systems (e.g., downloading from a fixed terminal to a mobile terminal, or mobile-to-mobile communications). Additionally, a good end-fire pattern for 60 GHz ISM band is needed where switching between different patterns to find the best Signal-to-Noise (SNR) ratio.

Two types of end fire antenna designs are currently used, both of which have various drawbacks discussed below. Printed antennae (e.g., Yagi, RPMA, UWB hexagonal, etc.) are one type of end fire antennae. However, printed antennae suffer from poor bandwidth in some designs, low gain and sensitivity to parallel conductive planes. Aperture antennae are another type of end fire antennae. However, existing aperture antennae result in a tradeoff between effective bandwidth and size of the package. As the height of the package is decreased, the effective bandwidth is also reduced. Further, existing technology does not allow for a low form factor aperture antenna, and existing aperture antennas have very complex structures.

In existing end fire antennae, an increase in gain of the antenna requires an increase in size (e.g., thickness) of the antenna, making it difficult to achieve high gain antennae in low form factor applications. Alternatively, a reduction in the thickness of the antenna package results in a reduction in the bandwidth and the gain. Additionally, as the thickness of the package is reduced, the width (longer dimension) of the aperture in an aperture antenna needs to be increased to achieve good directivity, where the directivity is proportional to the aperture area. However, an increase in the width of the aperture results in a reduction in impedance, and can lead to the introduction of Ten0 modes which kill the gain across the bandwidth. The smallest thickness reported in an aperture end-fire antenna, with 57-64 GHz bandwidth is 1 mm, an array of 1×2, and overall size of 14.4 mm×14.4 mm×1 mm, giving a 6 dBi gain.

SUMMARY

Accordingly, there is a need for an end-fire antenna, especially a 60 GHz mobile antenna, that is able to meet height limitations and fit in a package in low form factor applications, is isolated from surrounding environment, and provides a wide bandwidth and high gain.

In accordance with one aspect, a wireless mobile device is provided. The wireless mobile device comprises an end-fire antenna defined by a dielectric layer disposed between a pair of metal layers and an open cavity formed in the dielectric layer that is filled with air, the cavity defined by a pair of sidewalls that extend from an aperture of the cavity to a rear wall of the cavity, a depth of the cavity defined between the aperture and the rear wall.

In accordance with another aspect, an end-fire antenna is provided. The end-fire antenna comprises a first metal layer, a second metal layer, and a dielectric layer disposed between the first and second metal layers. An open cavity is formed in the dielectric layer that is filled with air, the cavity defined by a pair of sidewalls that extend from an aperture of the cavity to a rear wall of the cavity, a depth of the cavity defined between the aperture and the rear wall.

In accordance with another aspect, a radiofrequency module is provided, comprising an end-fire antenna defined by a dielectric layer disposed between a pair of metal layers and an open cavity formed in the dielectric layer that is filled with air, the cavity defined by a pair of sidewalls that extend from an aperture of the cavity to a rear wall of the cavity, a depth of the cavity defined between the aperture and the rear wall.

In accordance with another aspect, a method of making an end-fire antenna is provided. The method comprises forming a first metal layer. The method also comprises forming dielectric layer in contact with the first metal layer. The method also comprises forming an open cavity in the dielectric layer that is filled with air, the cavity defined by a pair of sidewalls that extend from an aperture of the cavity to a rear wall of the cavity, a depth of the cavity defined between the aperture and the rear wall. The method also comprises forming a second metal layer in contact with an opposite side of the dielectric layer than the first metal layer.

DETAILED DESCRIPTION

The headings provided herein, if any, are for convenience only and do not necessarily affect the scope or meaning of the claimed invention.

Figure 1:
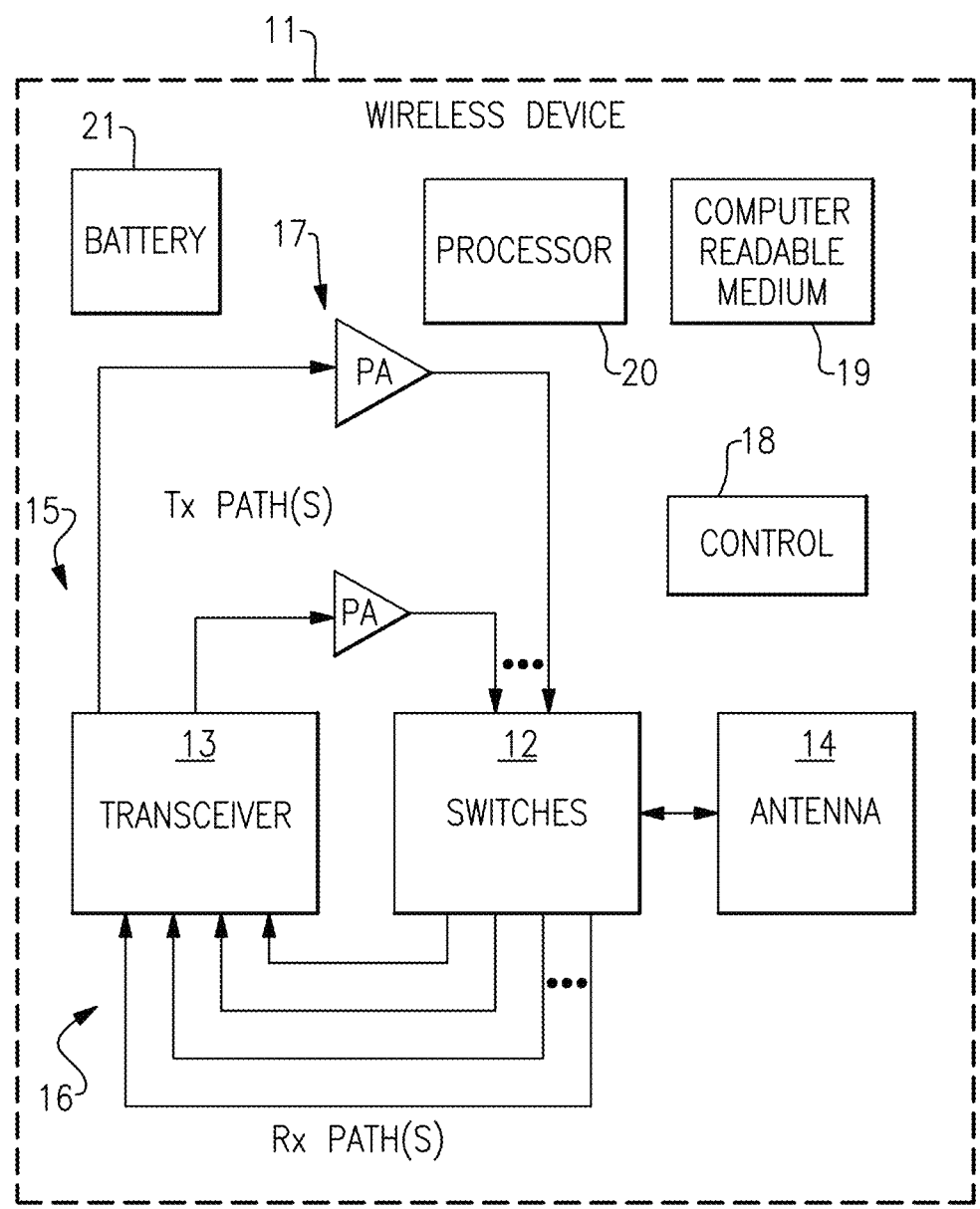
FIG. 1 is a schematic block diagram of one example of a wireless device that can include one or more antenna switch modules.

Overview of Examples of Wireless Devices that can include Antenna Switch Modules FIG. 1 is a schematic block diagram of one example of a wireless or mobile device 11 that can include one or more antenna switch modules. The wireless device 11 can include antenna switch modules implementing one or more features of the present disclosure.

Antenna switch modules can be used within the wireless or a mobile device 11 implementing a 5G telecommunication standard that may utilize 30 GHz and 60-70 GHz frequency bands. Additionally, the 3G, 4G, LTE, or Advanced LTE telecommunication standards can be used with the antenna switch modules in the wireless or mobile device 11, as described herein.

The example wireless device 11 depicted in FIG. 1 can represent a multi-band and/or multi-mode device such as a multi-band/multi-mode mobile phone. By way of examples, Global System for Mobile (GSM) communication standard is a mode of digital cellular communication that is utilized in many parts of the world. GSM mode mobile phones can operate at one or more of four frequency bands: 850 MHz (approximately 824-849 MHz for Tx, 869-894 MHz for Rx), 900 MHz (approximately 880-915 MHz for Tx, 925-960 MHz for Rx), 1800 MHz (approximately 1710-1785 MHz for Tx, 1805-1880 MHz for Rx), and 1900 MHz (approximately 1850-1910 MHz for Tx, 1930-1990 MHz for Rx). Variations and/or regional/national implementations of the GSM bands are also utilized in different parts of the world.

Code division multiple access (CDMA) is another standard that can be implemented in mobile phone devices. In certain implementations, CDMA devices can operate in one or more of 800 MHz, 900 MHz, 1800 MHz and 1900 MHz bands, while certain W-CDMA and Long Term Evolution (LTE) devices can operate over, for example, about 22 radio frequency spectrum bands.

In certain embodiments, the wireless device 11 can include an antenna switch module 12, a transceiver 13, an antenna 14, power amplifiers 17, a control component 18, a computer readable medium 19, a processor 20, and a battery 21.

The transceiver 13 can generate RF signals for transmission via the antenna 14. Furthermore, the transceiver 13 can receive incoming RF signals from the antenna 14. It will be understood that various functionalities associated with transmitting and receiving of RF signals can be achieved by one or more components that are collectively represented in FIG. 1 as the transceiver 13. For example, a single component can be configured to provide both transmitting and receiving functionalities. In another example, transmitting and receiving functionalities can be provided by separate components.

In FIG. 1, one or more output signals from the transceiver 13 are depicted as being provided to the antenna 14 via one or more transmission paths 15. In the example shown, different transmission paths 15 can represent output paths associated with different bands and/or different power outputs. For instance, the two different paths shown can represent paths associated with different power outputs (e.g., low power output and high power output), and/or paths associated with different bands. The transmit paths 15 can include one or more power amplifiers 17 to aid in boosting a RF signal having a relatively low power to a higher power suitable for transmission. Although FIG. 1 illustrates a configuration using two transmission paths 15, the wireless device 11 can be adapted to include more or fewer transmission paths 15.

In FIG. 1, one or more detected signals from the antenna 14 are depicted as being provided to the transceiver 13 via one or more receiving paths 16. In the example shown, different receiving paths 16 can represent paths associated with different bands. For example, the four example paths 16 shown can represent quad-band capability that some wireless devices are provided with. Although FIG. 1 illustrates a configuration using four receiving paths 16, the wireless device 11 can be adapted to include more or fewer receiving paths 16.

To facilitate switching between receive and/or transmit paths, the antenna switch module 12 can be included and can be used electrically connect the antenna 14 to a selected transmit or receive path. Thus, the antenna switch module 12 can provide a number of switching functionalities associated with an operation of the wireless device 11. The antenna switch module 12 can include a multi-throw switch configured to provide functionalities associated with, for example, switching between different bands, switching between different power modes, switching between transmission and receiving modes, or some combination thereof. The antenna switch module 12 can also be configured to provide additional functionality, including filtering and/or duplexing of signals.

FIG. 1 illustrates that in certain embodiments, the control component 18 can be provided for controlling various control functionalities associated with operations of the antenna switch module 12 and/or other operating component(s). For example, the control component 18 can aid in providing control signals to the antenna switch module 12 so as to select a particular transmit or receive path.

In certain embodiments, the processor 20 can be configured to facilitate implementation of various processes on the wireless device 11. The processor 20 can be a general purpose computer, special purpose computer, or other programmable data processing apparatus. In certain implementations, the wireless device 11 can include a computer-readable memory 19, which can include computer program instructions that may be provided to and executed by the processor 20.

The battery 21 can be any suitable battery for use in the wireless device 11, including, for example, a lithium-ion battery.

Figure 2:
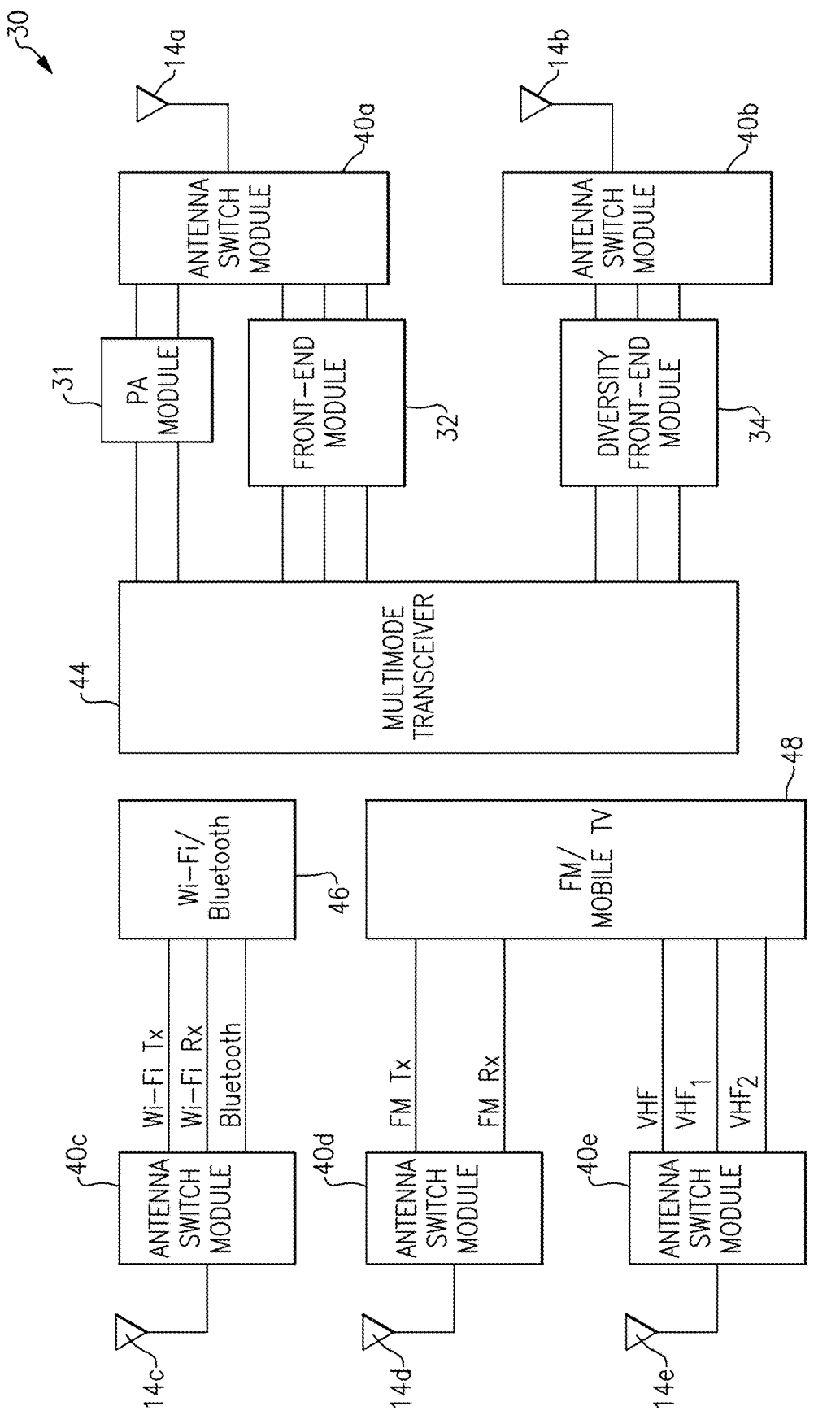
FIG. 2 is a schematic block diagram of another example of a wireless device that can include one or more antenna switch modules.

FIG. 2 is a schematic block diagram of another example of a wireless device 30 that can include one or more antenna switch modules. The illustrated wireless device 30 includes first to fifth antennas 14a-14e, a power amplifier module 31, a front-end module 32, a diversity front-end module 34, first to fifth antenna switch modules 40a-40e, a multimode transceiver 44, a Wi-Fi/Bluetooth module 46, and a FM/Mobile TV module 48.

The multimode transceiver 44 is electrically coupled to the power amplifier module 31, to the front-end module 32, and to the diversity front-end module 34. The multimode transceiver 44 can be used to generate and process RF signals using a variety of communication standards, including, for example, 5G, Global System for Mobile Communications (GSM), Code Division Multiple Access (CDMA), wideband CDMA (W-CDMA), Enhanced Data Rates for GSM Evolution (EDGE), and/or other proprietary and non-proprietary communications standards.

The power amplifier module 31 can include one or more power amplifiers, which be used to boost the power of RF signals having a relatively low power. Thereafter, the boosted RF signals can be used to drive the first antenna 14a. The power amplifier module 31 can include power amplifiers associated with different power outputs (e.g., low power output and high power output) and/or amplifications associated with different bands.

The front-end module 32 can include circuitry that can aid the multimode transceiver 44 in transmitting and receiving RF signals. For example, the front-end module 32 can include one or more low noise amplifiers (LNAs) for amplifying signals received using the first antenna 14a. The front-end module 32 can additionally and/or alternatively include filter circuitry, input and output matching circuitry and/or power detection circuitry. In certain implementations, the front-end module 32 can also include one or more power amplifiers.

The first antenna switch module 40a is electrically coupled to the first antenna 14a, to the power amplifier module 31, and to the front-end module 32. The first antenna switch module 40a can be used to electrically connect the first antenna 14a to a desired transmit or receive path. In certain embodiments described herein, the antenna switch module 40a can have a relatively small area, thereby improving the form factor of a mobile device used to communicate over a cellular or other network. The antenna switch module 40a can also have a low insertion loss and high band-to-band isolation, which can improve the quality of signals transmitted or received. For example, the antenna switch module can improve the quality of voice or data transmissions made using the first antenna 14a and/or improve reception quality for a given amount of power consumption.

In certain implementations, the diversity front-end module 34, the second antenna switch module 40b, and the second or diversity antenna 14b can also be included. Using a diversity front-end module 34 and the second antenna 14b can help improve the quality and/or reliability of a wireless link by reducing line-of-sight losses and/or mitigating the impacts of phase shifts, time delays and/or distortions associated with signal interference of the first antenna 14a. In some implementations, a plurality of diversity front-end modules, diversity antennas, and antenna switch modules can be provided to further improve diversity.

As illustrated in FIG. 2, the second antenna switch module 40b has been used to select amongst a multitude of RF signal paths associated with the diversity antenna 14b. In certain embodiments described herein, the second antenna switch module 14b can have a small area and a relatively low insertion loss and noise. Accordingly, the second antenna switch module 14b can help improve signal quality in the diversity signal path for a given power level, thereby reducing the probability of a call drop-out or a lost connection. Furthermore, by providing an antenna switch module with a smaller area, the form factor of the wireless device 30 can be reduced.

The wireless device 30 includes the Wi-Fi/Bluetooth module 46, which can be used to generate and process received Wi-Fi and/or Bluetooth signals. For example, the Wi-Fi/Bluetooth module 46 can be used to connect to a Bluetooth device, such as a wireless headset, and/or to communicate over the Internet using a wireless access point or hotspot. To aid in selecting a desired Wi-Fi or Bluetooth signal path, the third antenna switch module 14c has been included. In certain embodiments described herein, the antenna switch module 40c can have a relatively small area, thereby improving the form factor of a mobile device used to communicate over the Internet and/or with a Bluetooth accessory. The antenna switch module 40c can also have a low insertion loss and a high isolation, which can impact the quality of voice transmissions made or received using a Bluetooth device and/or improve the quality of a Wi-Fi Internet connection. For example, the antenna switch module 40c can improve connection strength and/or access range of the wireless device 30 to a wireless access point for a given amount of power consumption.

The FM/Mobile TV module 48 can be included in the wireless device 30, and can be used to receive and/or transmit radio or television signals, such as FM signals and/or VHF signals. The FM/Mobile TV module 48 can communicate with the fourth and fifth antennas 14d, 14e using the fourth and fifth antenna switch modules 40d, 40e, respectively. In certain embodiments, the antenna switch modules 40d, 40e can have a relatively small area, thereby improving the form factor of a mobile device having mobile TV or FM radio capabilities. Additionally, the antenna switch modules 40d, 40e can also have a low insertion loss and high isolation, which can lead to improved streaming of multimedia content for a given amount of power consumption.

Although antenna switch modules have been illustrated and described above in the context of two examples of wireless devices, the antenna switch modules described herein can be used in other wireless devices and electronics.

End-fire Aperture Antenna

Figure 3:
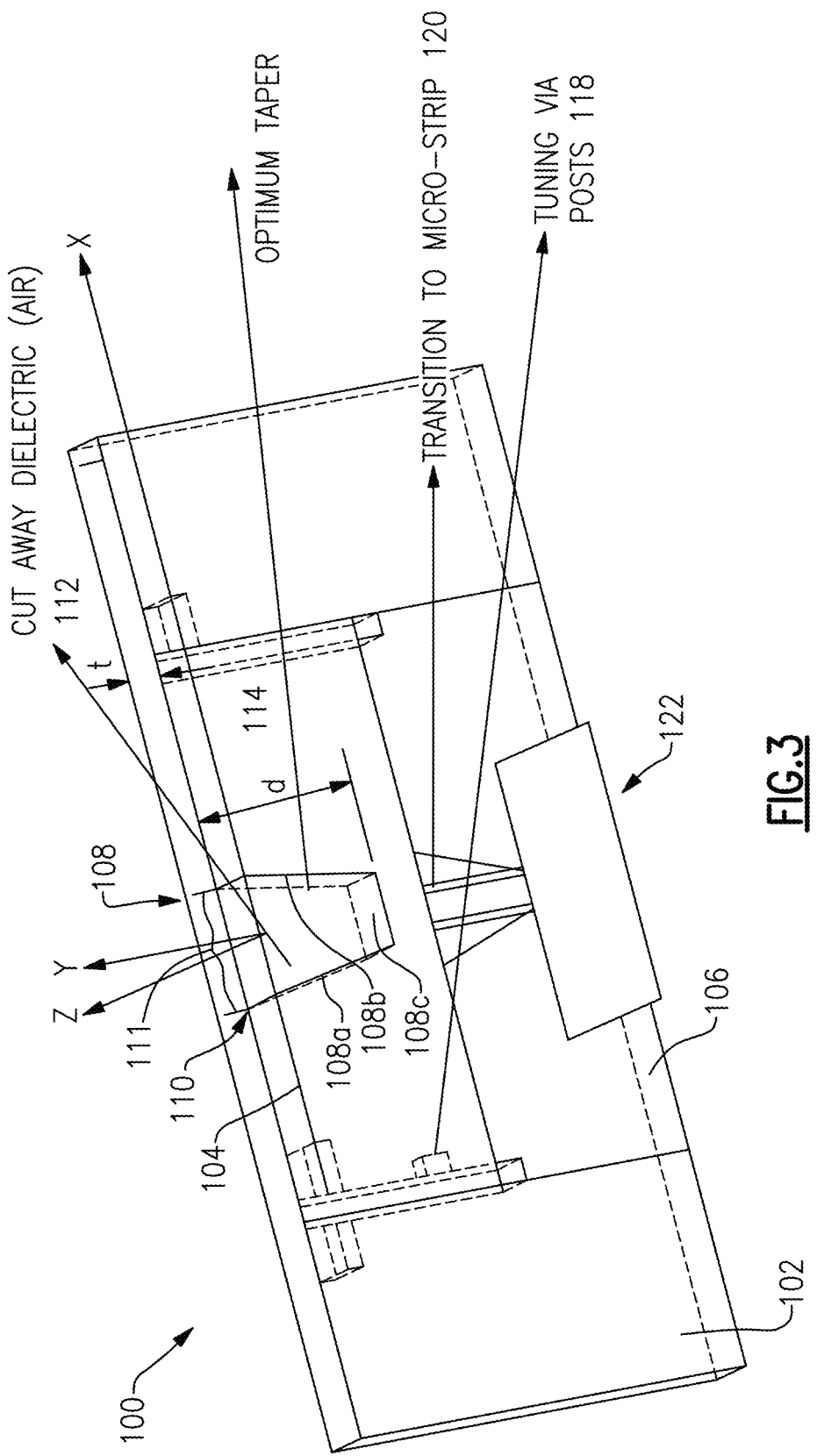
FIG. 3 is a schematic perspective view of one embodiment of an end fire aperture antenna.
Figure 4:
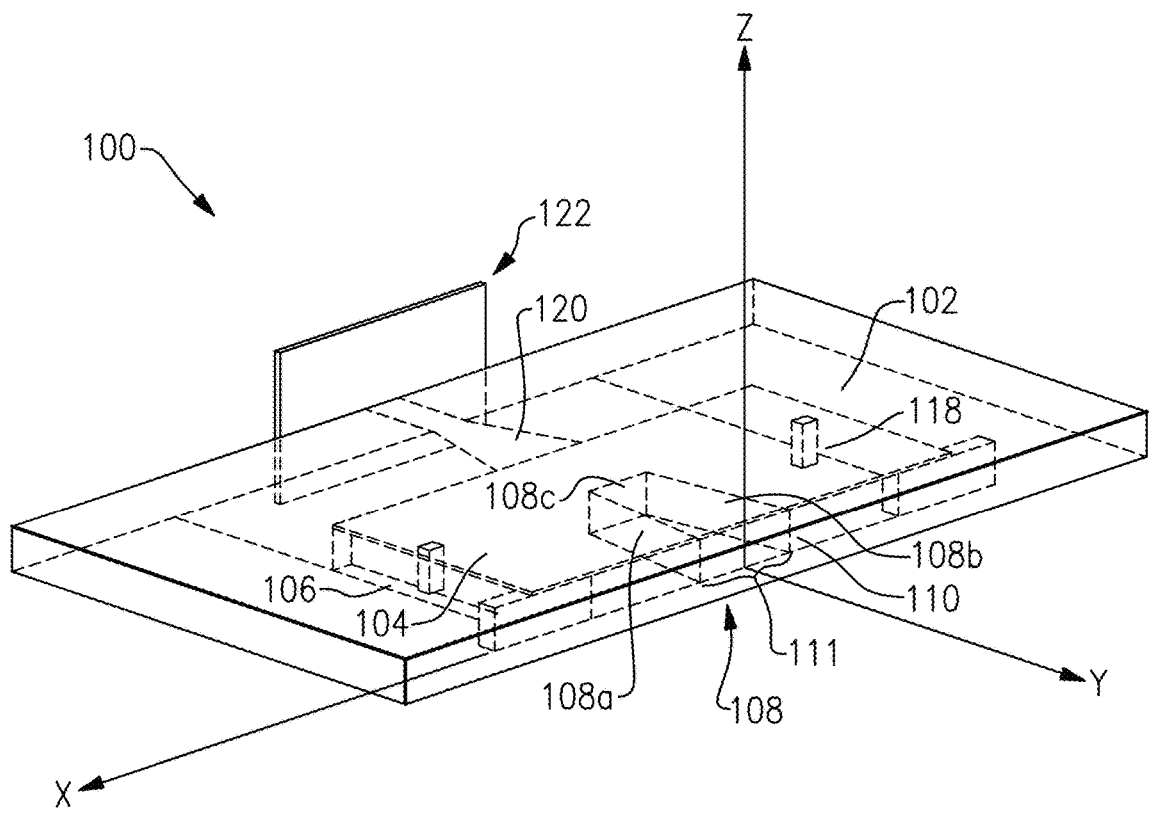
FIG. 4 is a schematic perspective view of one embodiment of an end fire aperture antenna.
Figure 5:
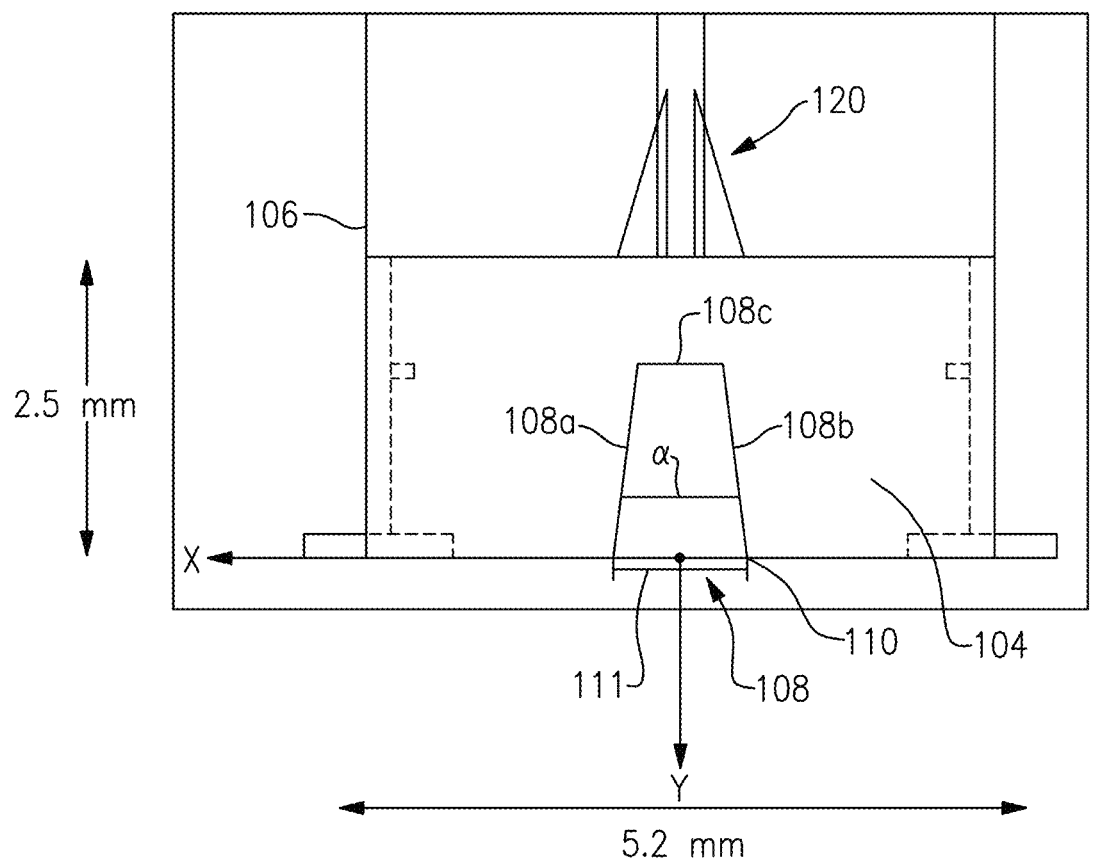
FIG. 5 is a schematic planar view of the end figure aperture antenna of FIG. 3.

FIGS. 3-5 show one embodiment of an antenna 100. In the illustrated embodiment, the antenna 100 is a generally planar end-fire antenna for wideband low form factor applications. The antenna 100 can include a dielectric layer 102 disposed between metal plates 104, 106. The antenna 100 has a cavity 108 (e.g., a single cavity) defined in the dielectric layer 102. Advantageously, the cavity 108 is open (i.e., unfilled or filled with air) and has a volume defined by side walls 116a, 116b that extend from an opening 110 to a rear wall 108c of the cavity 108 (e.g., defining an air cavity). The cavity 108 is defined by a thickness 112, a depth 114, and a width 111 of the opening 220. The end-fire antenna 100 can have tuning posts 118 to tune the center frequency, and a transition portion 120 to a micro-strip 122. The width 111 of the aperture or opening 110 can be tuned to achieve the desired directivity. The cavity 108 can be formed in the dielectric layer 102 using printed circuit board (PCB) manufacturing processes.

In the illustrated embodiment, the cavity 108 is optionally a tapered cavity (e.g., the side walls 108a, 108b extend at an angle from the opening 110 to the rear wall 108c, where the width of the opening 110 along the X direction is greater than the width of the rear wall 108c). In one embodiment, the taper angle α between the inclined side walls 108a, 108b can be about 0-15 degrees. In one embodiment, the taper angle α can be about 11 degrees. However, the taper angle α can have other suitable values. In the illustrated embodiment, best shown in FIG. 5, the dimensions of the substrate integrated waveguide (SIW) end-fire antenna, excluding the transition 120, can be about 5.2 mm (width)×2.5 mm (length)×0.4 mm (thickness or height). In other embodiments, the antenna 100 can have other suitable dimensions. For example, in other embodiments the thickness or height of the antenna 100 can be reduced (e.g., to 200 microns, 300 microns) without having to vary the length and width of the antenna 100 or a drop in performance. The thickness 112 can vary between about 100 microns and about 1 mm. In some implementations, the thickness 112 can vary between 200 microns and about 400 microns. However, the thickness 112 can have other suitable values that are greater or smaller than these. Accordingly, the embodiment disclosed herein for the antenna 100 including an air cavity 108 allow for antenna dimensions suitable for low form factor applications.

In another embodiment, the cavity 108 can optionally be rectangular (e.g., the side walls 108a, 108b extend generally parallel to each other and the width of the opening 110 is generally equal to the width of the rear wall 108c). In still another embodiment, the cavity 108 can optionally be diamond shaped (e.g., the side walls 108a, 108b between the opening 110 and rear wall 108c can be V-shaped to generally define a diamond shape). The cavity 108 can have other suitable shapes and still achieve performance advantages described further below.

Figure 6:
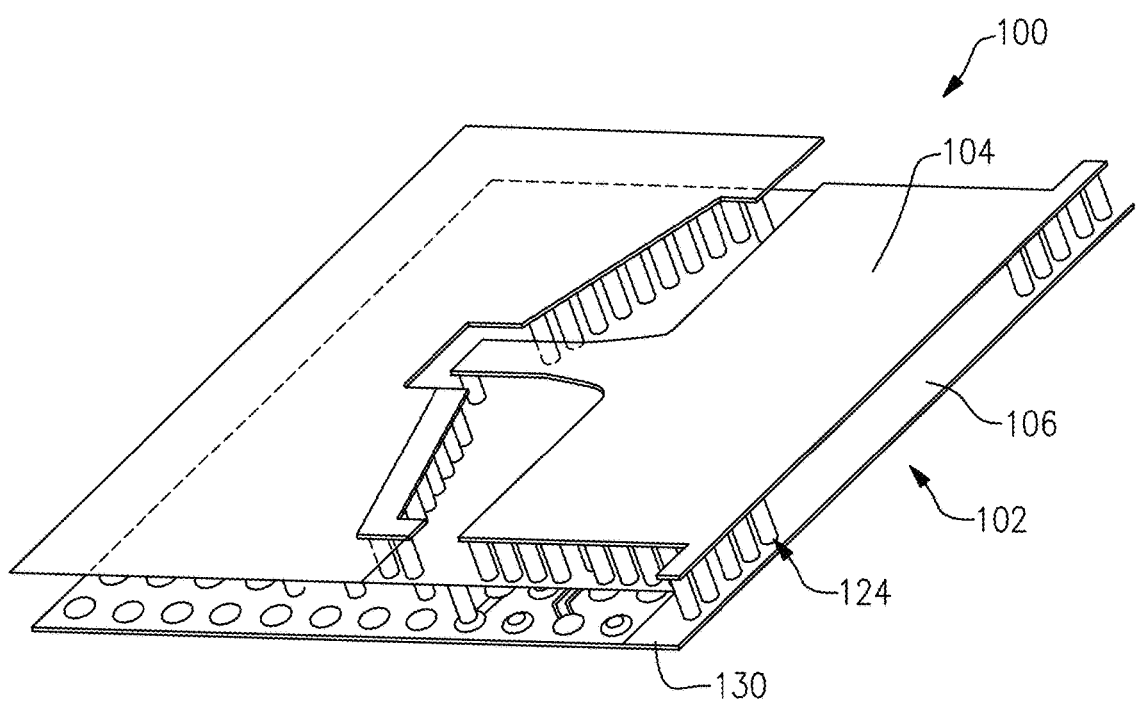
FIG. 6 is a schematic perspective view of one embodiment of an end fire aperture antenna connected to a printed circuit board (shown without a cavity).

FIG. 6 shows a circuit board 130 to which the antenna 100 is connected. For clarity, the dielectric layer 102 and air cavity 108 are not shown in this figure. The side walls of the antenna 100 and posts are defined using metal vias 124.

Advantageously, the cavity 108 (e.g. air cavity) increases the impedance (lower permittivity) of the waveguide, facilitating the matching of the antenna 100 to a wide-band to achieve a wide bandwidth. Additionally, the cavity 108 reduced the effective permittivity and the cap, and increases the bandwidth. Further, the cavity 108 suppresses higher order modes (e.g., TE30 and above), as discussed further below, and therefore improves the radiation gain and directivity of the antenna 100. The cut-off frequency of TE30 mode is three times the intended mode (TE10) and inversely proportional to the permittivity. Also, the air cavity 108 is not very sensitive to asymmetry.

The antenna 100 can be used in mobile devices (e.g., for mobile-to-mobile communications, or communication between a mobile device and a fixed terminal, such as a video download terminal), such as the wireless device 11 in FIG. 1 and wireless device 30 in FIG. 2. In one embodiment, the antenna 100 can be implemented in smartphones. Advantageously, at 30dB the antenna 100 can achieve a communication range of about 100 meters, whereas prior art antennas have a communication range of 1-20 meters.

In use, the size of the cavity (e.g., the depth 114 and width 111 of the opening or aperture 110) is chosen to optimize the performance of the antenna 100 (e.g. to achieve the same gain as the thickness 112 of the antenna 100 is reduced, such as to meet a specific low form factor application). Advantageously, no adjustment in the overall size of the antenna 100 (e.g., length and width) is needed to achieve the same gain as the thickness 112 of the antenna 100 is decreased, unlike prior art aperture antennae. In the illustrated embodiments, as the thickness 112 of the antenna 100 is reduced, the width 111 of the opening or aperture 110 and/or depth 114 of the cavity 108 can be altered (e.g., increased) to achieve the same gain, without altering the overall dimensions (length, width) of the antenna 100. Accordingly, the antenna 100 does not suffer from the tradeoff between size and gain that occurs in prior art antennae (e.g., prior art aperture antennae) when need to reduce the thickness of the antenna.

FIGS. 7-10B illustrate the performance of one embodiment of an end-fire aperture antenna, in accordance with the features described in this disclosure, as compared with an end-fire filled aperture (e.g., without an air cavity). As discussed below, the performance of the end-fire aperture antenna is superior to that of the filled aperture antenna. With respect to FIGS. 7-8 and 10A, the performance of an end-fire aperture antenna (e.g., with an air cavity 108), similar to the antenna 100 illustrated in FIGS. 3-5 was compared with the performance of an end-fire antennal without an aperture (e.g., filled or without a cavity). The end-fire aperture antenna has a rectangular cavity 108 and cavity dimensions of 0.7 mm (depth 114)×1.6 mm (width 111)×0.4 mm (thickness 112). Both the end-fire aperture antenna and the end-fire filled aperture antenna used in the tests illustrated in FIGS. 7-10B used HL972LD material with dielectric constant of 3.3, but the end-fire aperture antenna has an open air cavity, in accordance with the embodiments discussed herein, whereas the end-fire filled aperture antenna does not have a cavity formed in the dielectric layer.

Figure 7:
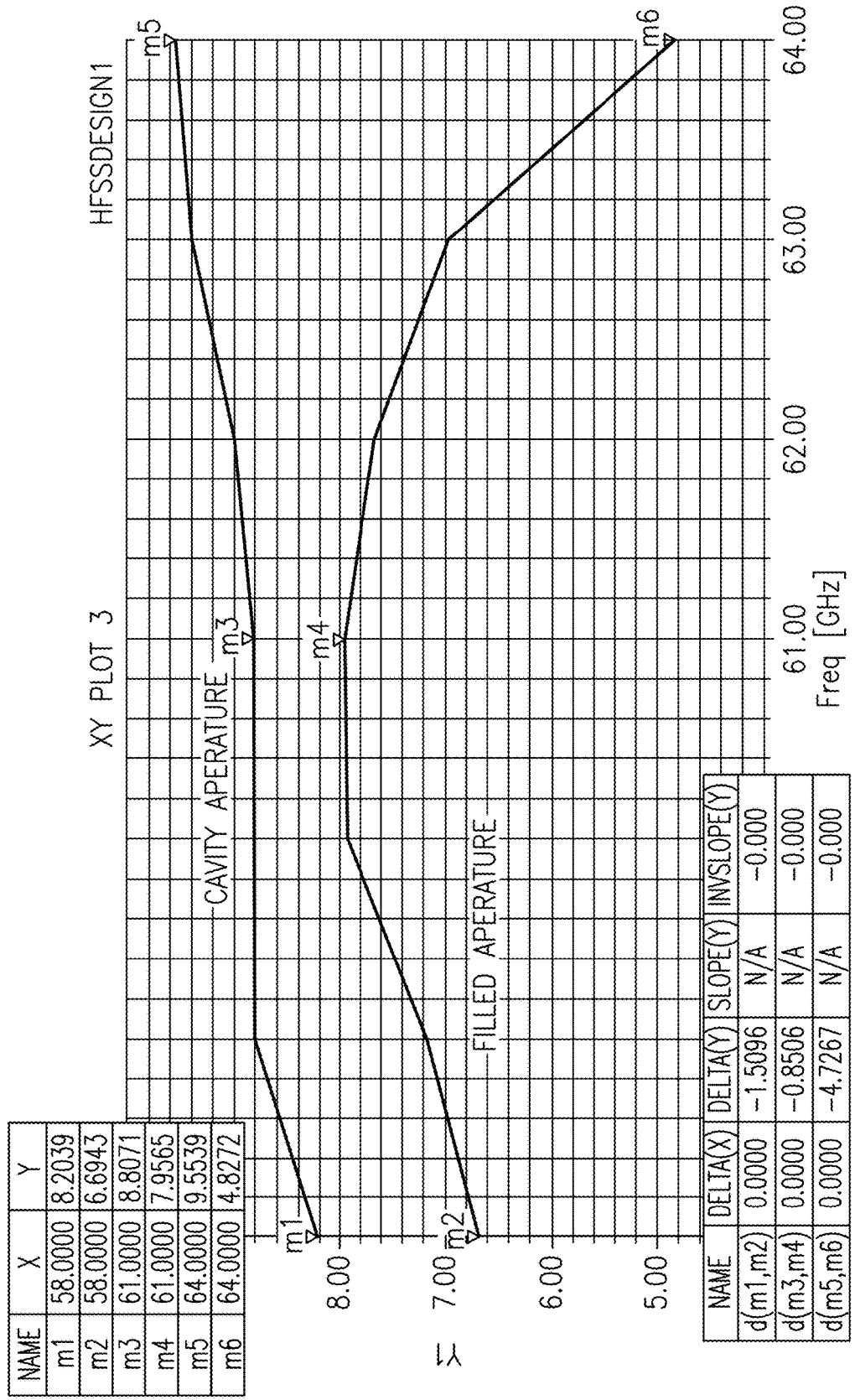
FIG. 7 is a plot of gain versus frequency performance for an end fire cavity aperture substrate integrated waveguide (SIW) antenna compared to a filled aperture antenna.

FIG. 7 illustrates a comparison of gain vs. frequency for the end-fire aperture SIW antenna and the end-fire filled aperture SIW antenna. As illustrated in the graph, the end-fire aperture antenna achieved a greater gain performance, achieving a maximum gain of about 9.5 dB or a maximum 4.7 dBi gain improvement in the band edges over the filled aperture antenna.

Figure 8:
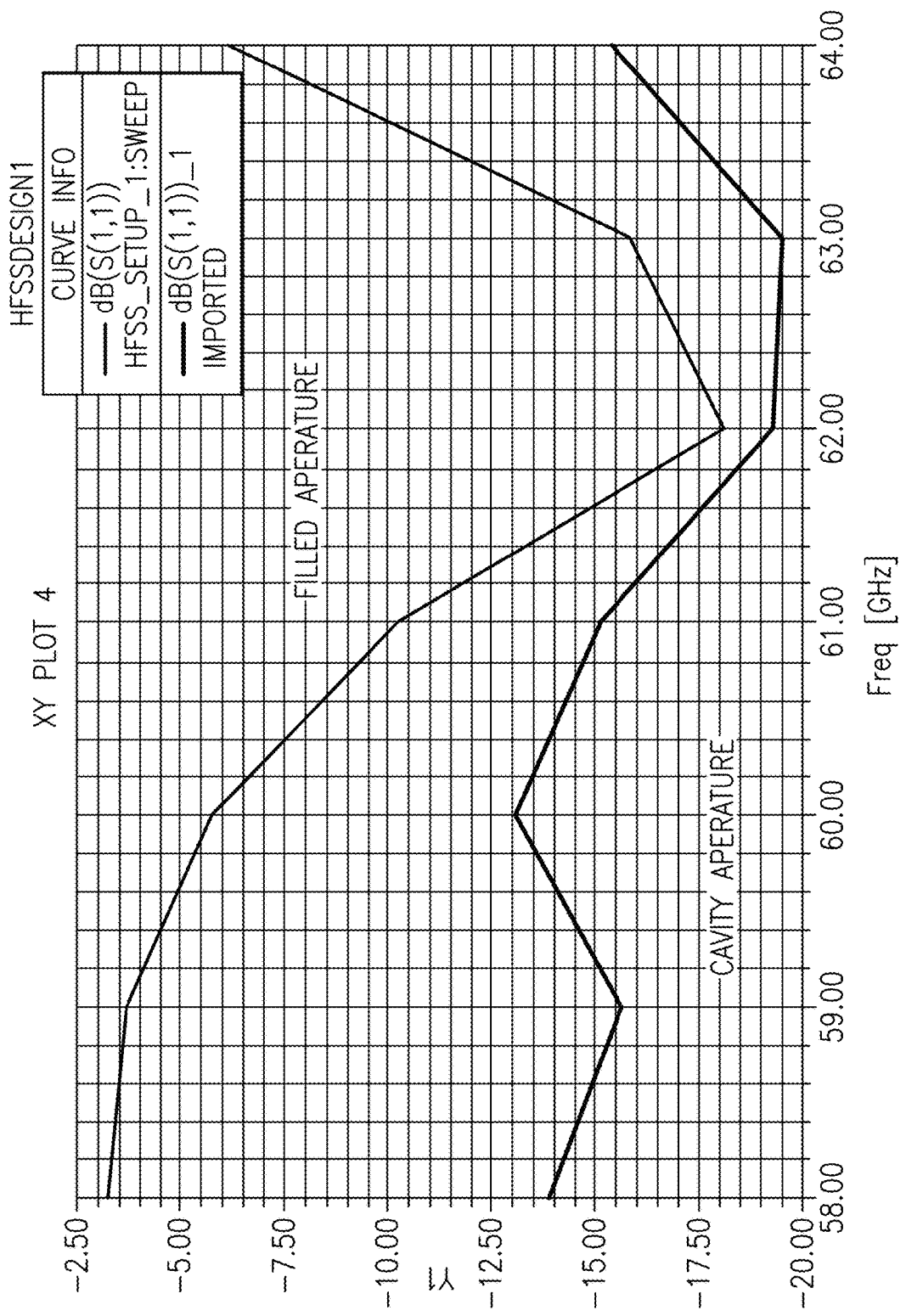
FIG. 8 is a plot of antenna return loss versus frequency performance for an end fire cavity aperture substrate integrated waveguide (SIW) antenna compared to a filled aperture antenna.

FIG. 8 illustrates a comparison of return loss vs. frequency for the end-fire aperture SIW antenna and the end-fire filled aperture SIW antenna. As illustrated in the graph, the end-fire aperture antenna achieved approximately a maximum 13 dB improvement in return loss. The end-fire aperture antenna improved the return loss bandwidth more than three times in the industrial, scientific and medical (ISM) band, almost tripling the 10 dB bandwidth.

Figure 9:
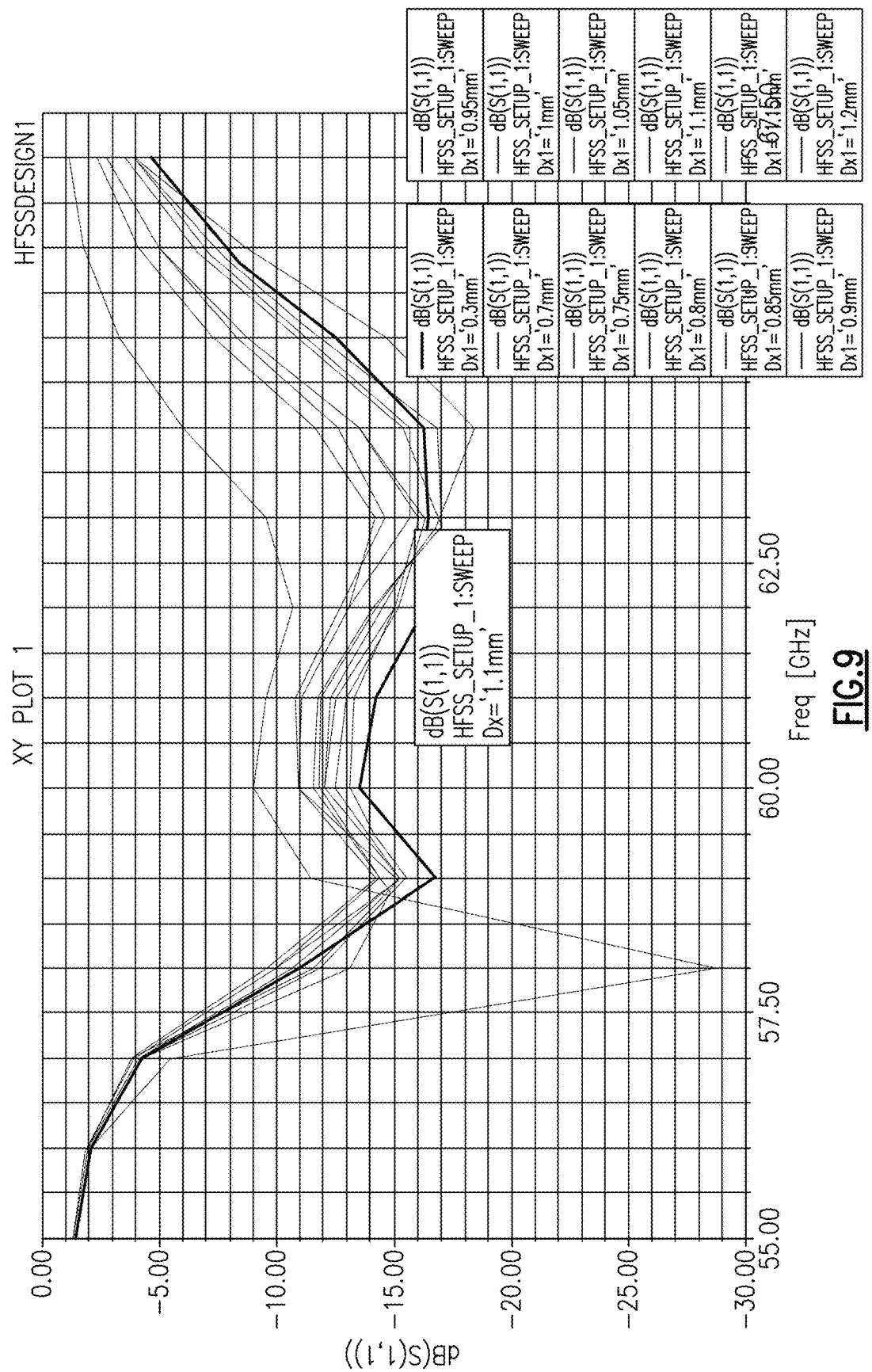
FIG. 9 is a plot showing sensitivity to cavity dimensions for an end fire cavity aperture substrate integrated waveguide (SIW) antenna.

FIG. 9 illustrates the sensitivity of the end-fire aperture SIW antenna to changes in the dimensions of the cavity 108. The cavity dimensions were varied +/−50 microns in the width 111 of the opening or aperture 110, and no significant changes in performance were observed. Accordingly, the performance of the end-fire aperture SIW antenna design disclosed herein is not overly sensitive to changes in the size and alignment changes of the cavity 108.

Figure 10A:
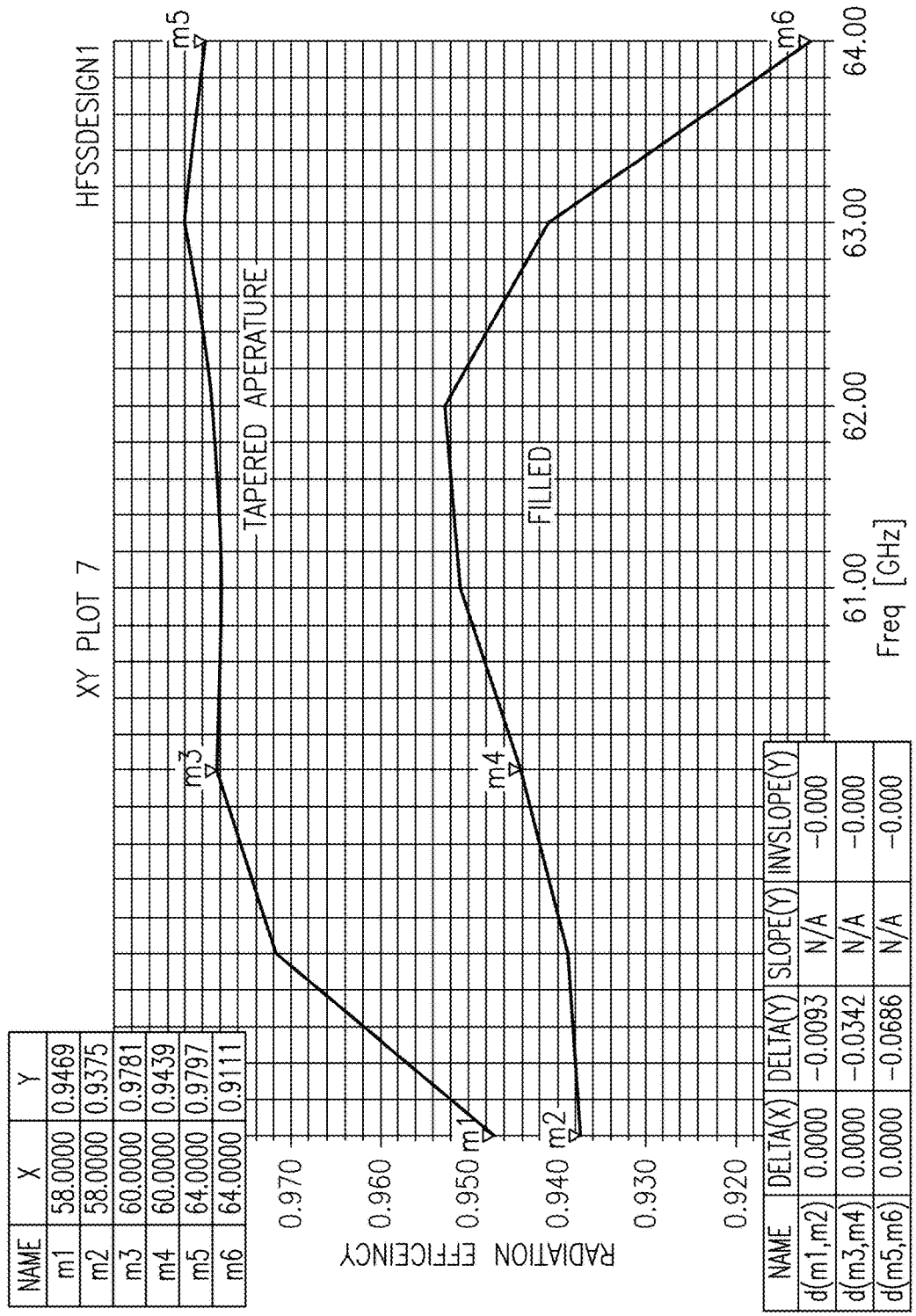
FIG. 10A is a plot of radiation efficiency versus frequency for an end fire cavity aperture antenna compared with a filled aperture antenna.
Figure 10B:
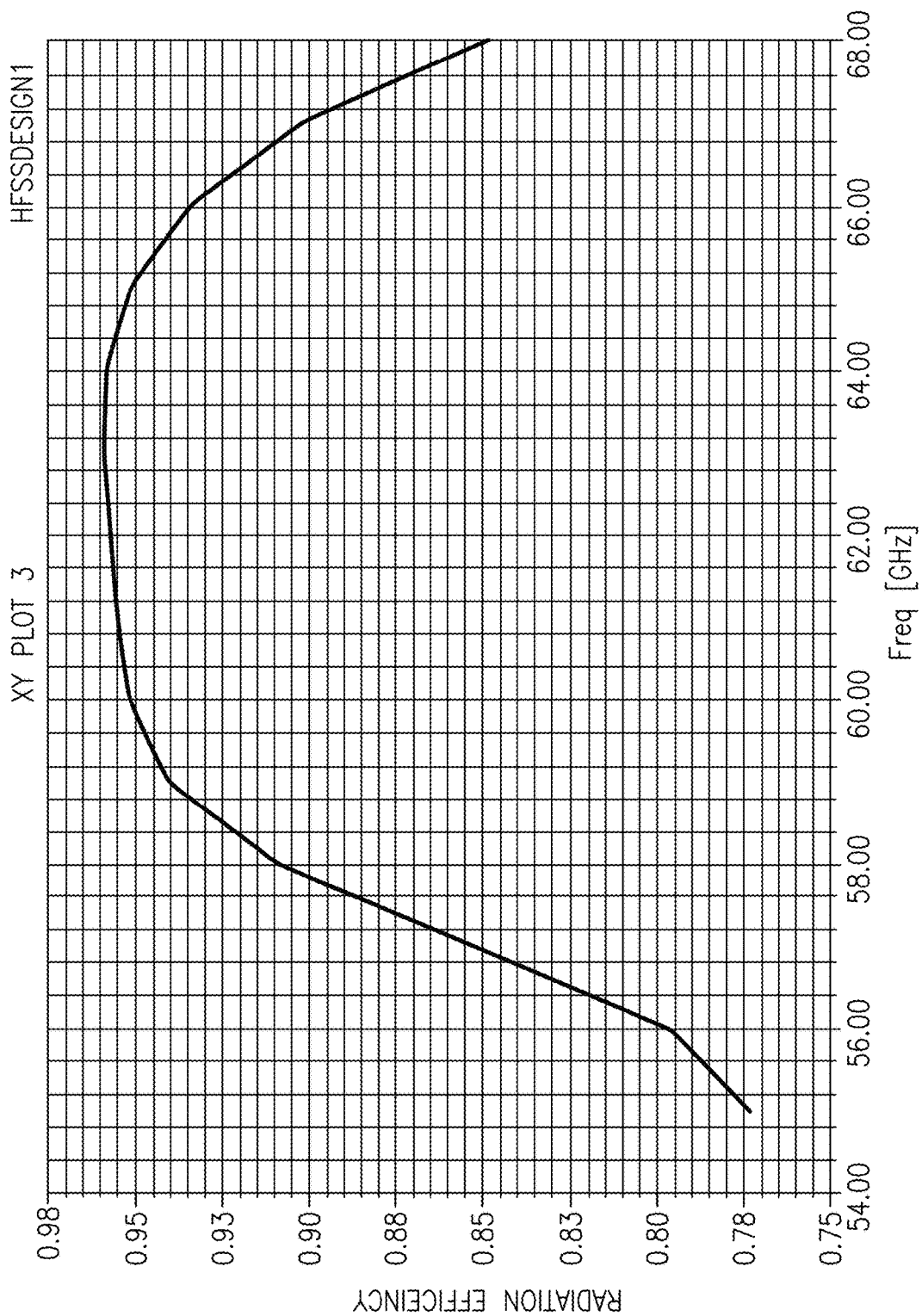
FIG. 10B is a plot of radiation efficiency versus frequency for an end fire cavity aperture antenna over a wider bandwidth than FIG. 10A.

FIG. 10A illustrates a comparison of radiation efficiency vs. frequency for the end-fire aperture SIW antenna and the end-fire filled aperture SIW antenna. As illustrated in the graph, the end-fire aperture antenna achieved greater radiation efficiency than the filled aperture antenna. FIG. 10B shows the radiation efficiency over a wider bandwidth. The end-fire aperture antenna achieved more than 80% radiation efficiency between 58-70 GHz, and the radiation efficiency increased by almost 10% within the ISM band edge at 64 GHz relative to the filled aperture antenna.

Figure 11:
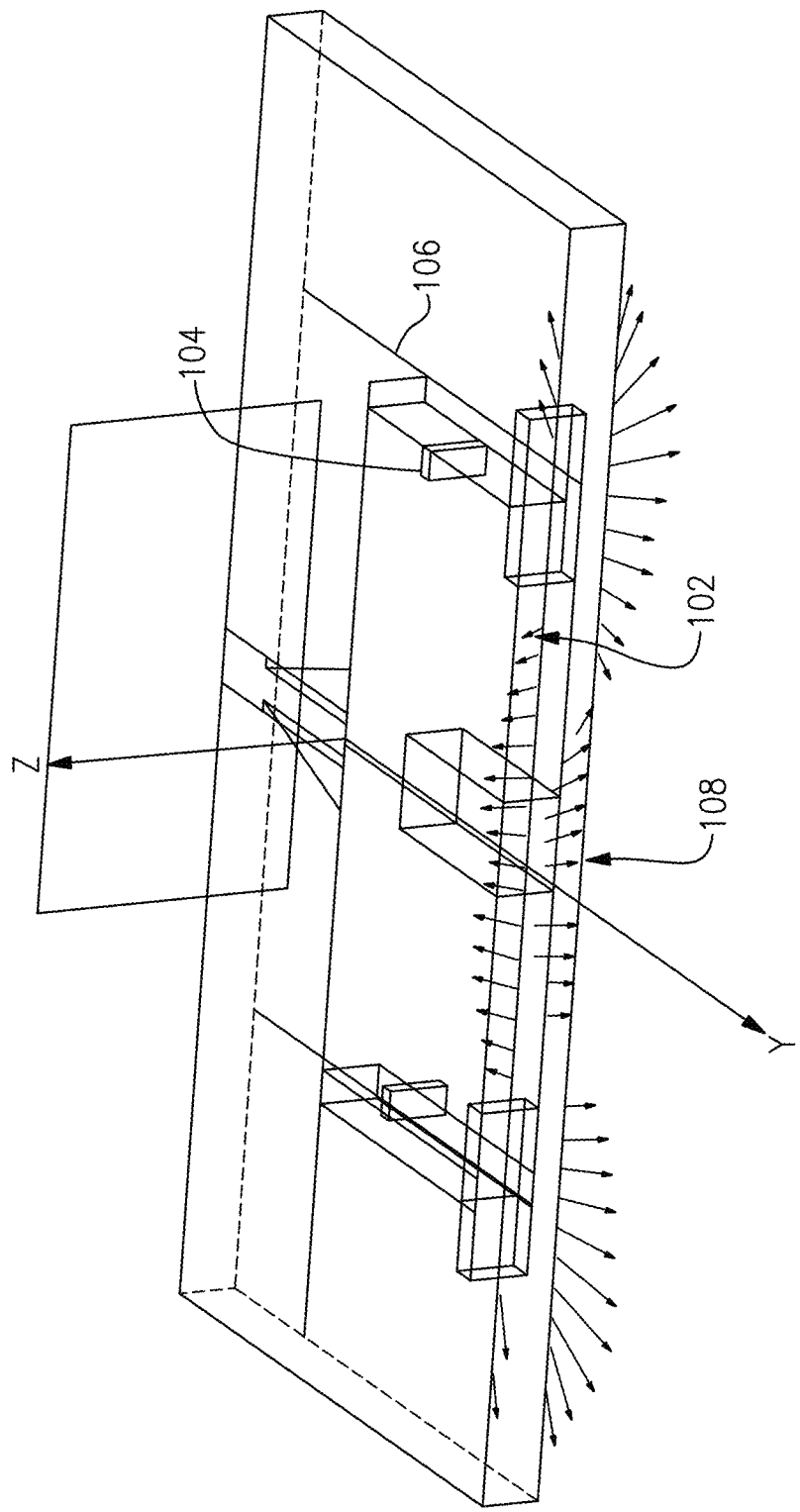
FIG. 11 shows an illustration of the mode suppression provided by an end fire cavity aperture antenna.

FIG. 11 illustrates the mode suppression achieved by the cavity 108 of the antenna 100. The dominant propagation mode is TE10, but due to the widening of the aperture to achieve the desired directivity, the TE30 mode is introduced, which will reduce radiation efficiency. However, adding the cavity (e.g., air cavity 108) increases the cut-off frequency of the TE30 mode, thereby eliminating the undesired mode so that TE10 is the dominant mode.

Figure 12:
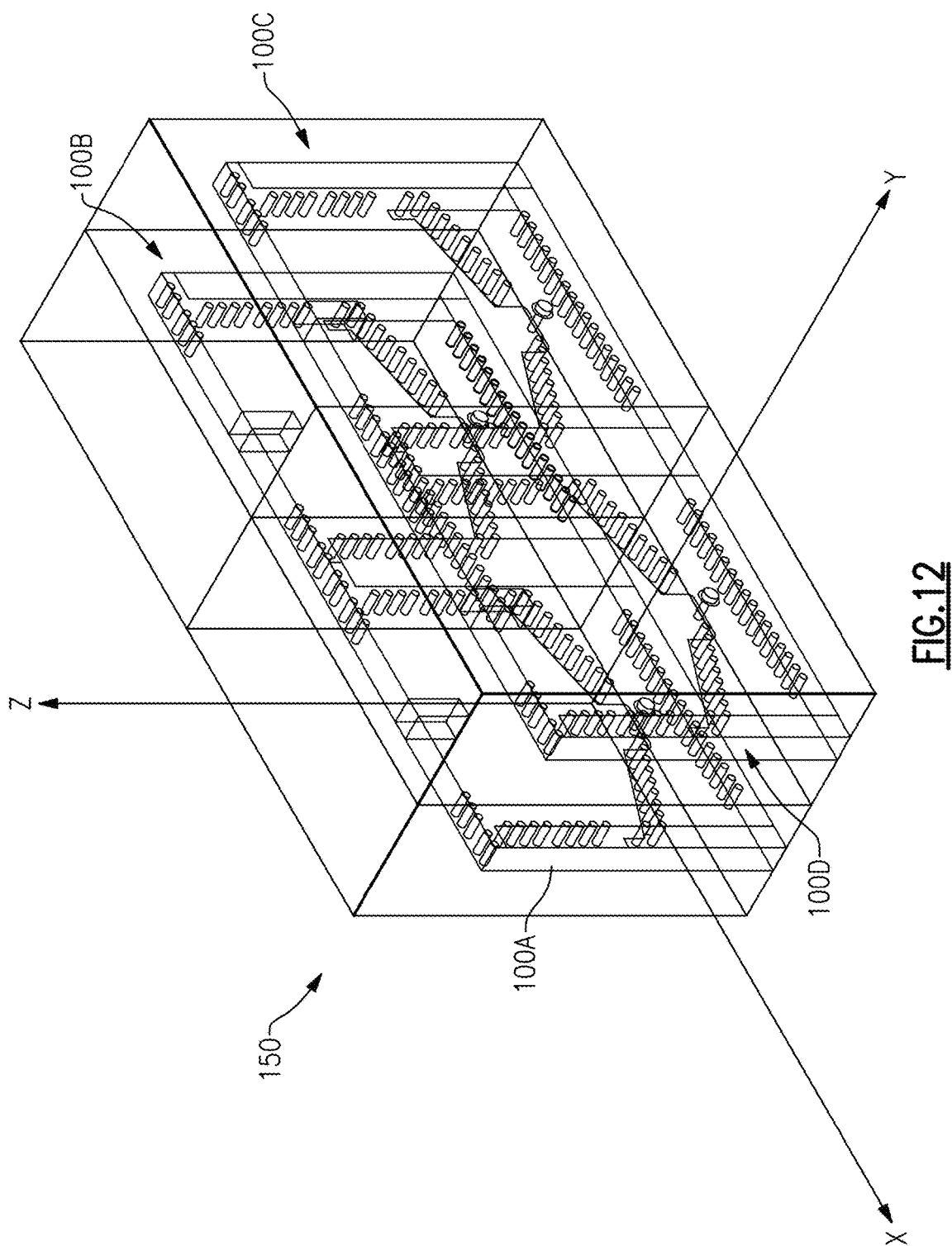
FIG. 12 shows a schematic perspective view of an array of antennas.

FIG. 12 shows one embodiment of an antenna structure 150 that can incorporate multiple antennae, such as the end-fire antennas 100, in an array. In the illustrated embodiment, the antenna structure 150 is a 2×2 array having antennas 100A, 100B, 100C and 100D.

Figure 13:
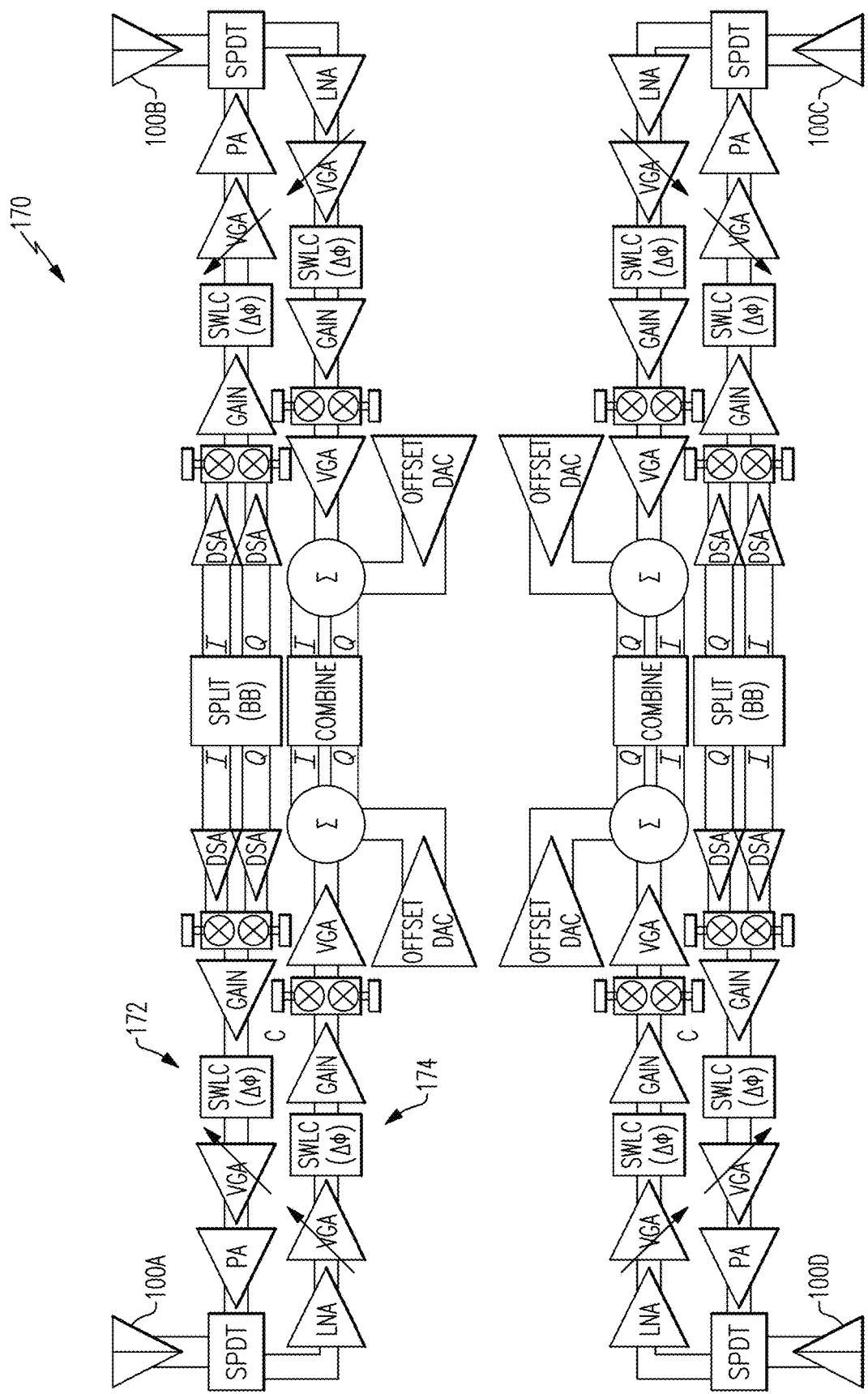
FIG. 13 shows a block diagram of a chip incorporating the array of antennas.

FIG. 13 shows a block diagram of an integrated circuit or chip 170 that drives the antenna structure 150, in the illustrated embodmient a 2×2 array having antennas 100A, 100B, 100C and 100D. One of more of the antennas 100A-100D can optionally be end-fire antennas, such as the antenna 100 described above. Each of the antennas 100A-100D in the chip 170 can communicate via a transmit path 172 that includes a switch (SPDT), power amplifier (PA), and variable gain amplifier (VGA) along with other componentry. The antennas 100A-100D can also communicate via a receive path 174 that includes the switch (SPDT), a low noise amplifier (LNA), and variable gain amplifier (VGA) along with other componentry in the chip 170.

Though FIGS. 12-13 show a 2×2 antenna array, one of skill in the art will recognize that the antenna structure 150 can have an array of any number of antennas. Such antenna arrays can be used in multi-input and multi-output (MIMO) communications, such as in massive MIMO systems (or large scale antenna systems), which can include a very large number of antennas (e.g., hundreds or thousands), and which can be used in handset or 5G technology (also referred to as 5G new radio (NR)).

Preliminary specifications for 5G NR support a variety of features, such as communications over millimeter wave spectrum, beam forming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges. The antenna structure disclosed herein is applicable to a wide variety of communication systems, including, but not limited to, communication systems using advanced cellular technologies, such as LTE-Advanced, LTE-Advanced Pro, and/or 5G NR.

Figure 14A:
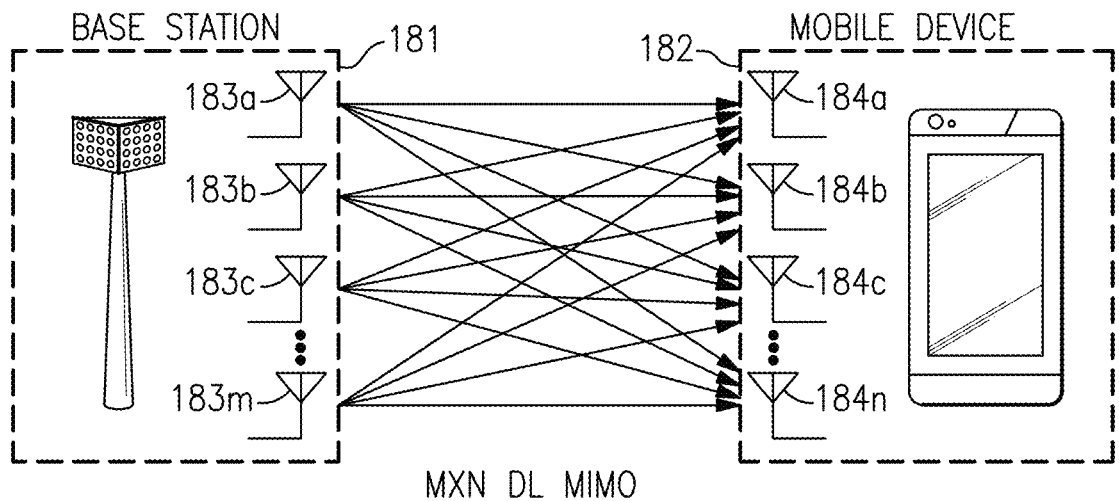
FIG. 14A is a schematic diagram of one example of a downlink channel using multi-input and multi-output (MIMO) communications.
Figure 14B:
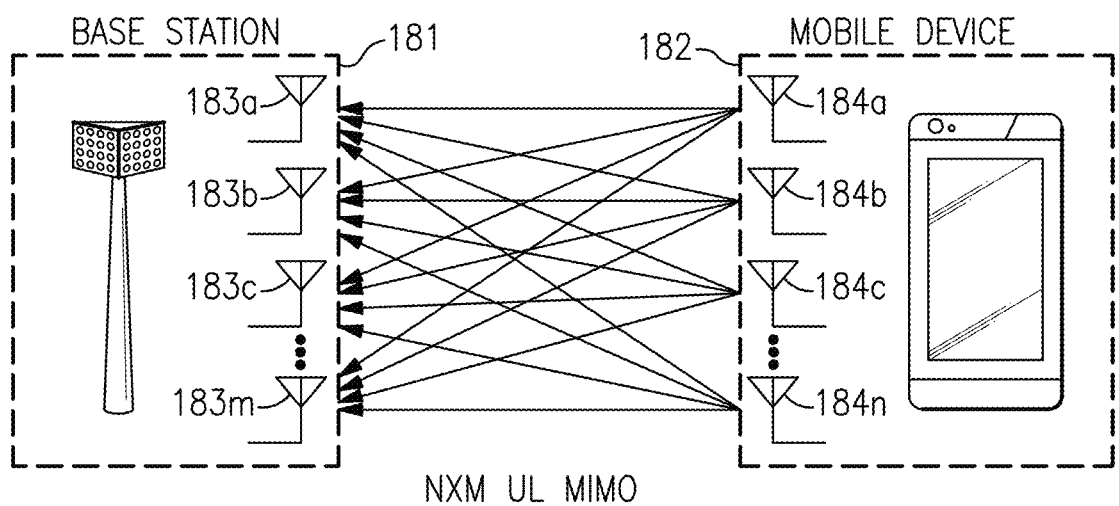
FIG. 14B is schematic diagram of one example of an uplink channel using MIMO communications.

FIG. 14A is a schematic diagram of one example of a downlink channel using multi-input and multi-output (MIMO) communications. FIG. 14B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher signal-to-noise ratio (SNR), improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for user devices or user equipment (UE), such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 14A, downlink MIMO communications are provided by transmitting using M antennas 183a, 183b, 183c, . . . 183m of the base station 181 and receiving using N antennas 184a, 184b, 184c, . . . 184n of the mobile device 182. Accordingly, FIG. 2A illustrates an example of M×N DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 14B, uplink MIMO communications are provided by transmitting using N antennas 184a, 184b, 184c, . . . 184n of the mobile device 182 and receiving using M antennas 183a, 183b, 183c, . . . 183m of the base station 41. Accordingly, FIG. 14 B illustrates an example of N×M UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 15:
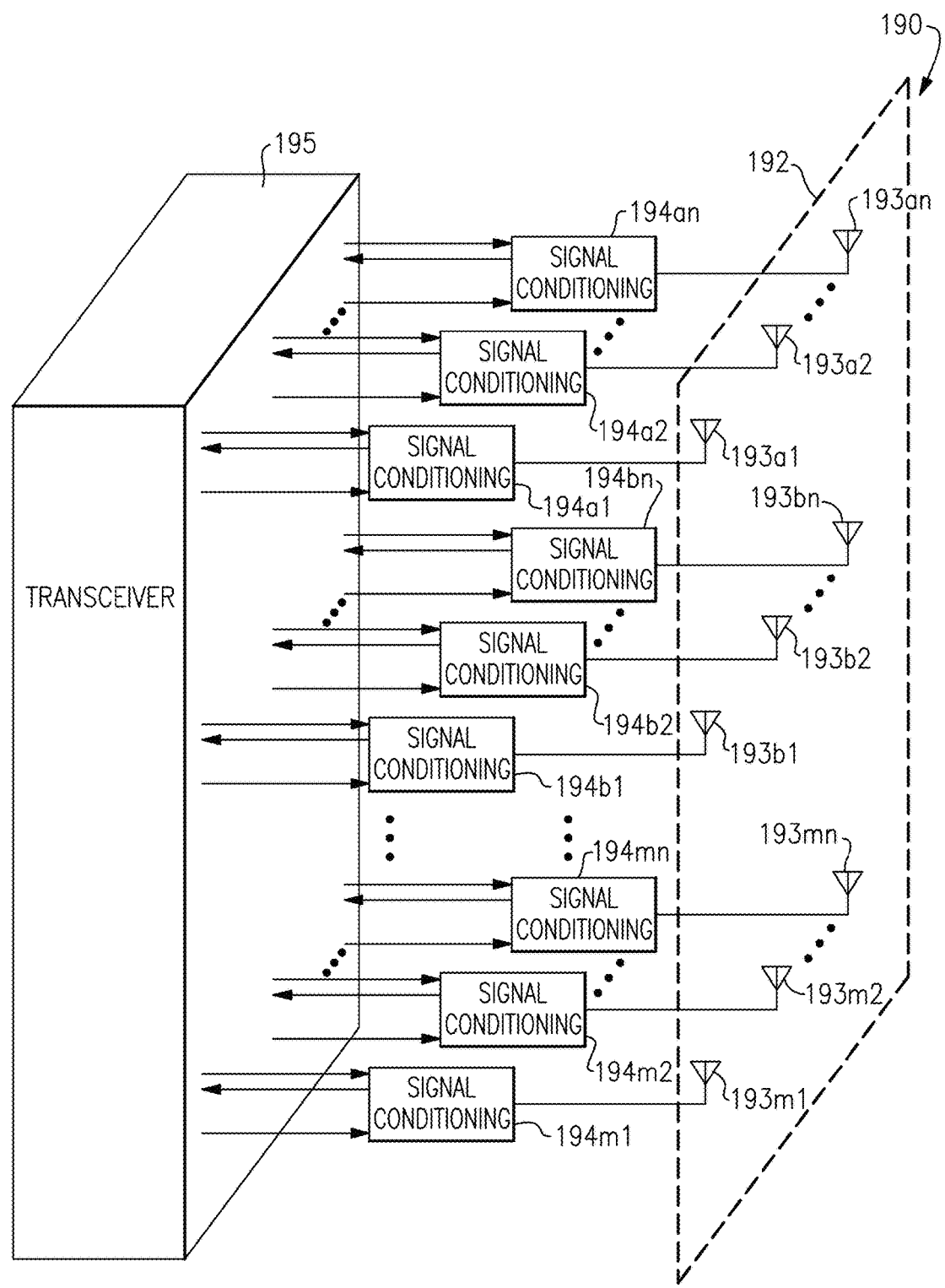
FIG. 15 is a schematic diagram of one example of a communication system that operates with beamforming.

FIG. 15 is a schematic diagram of one example of a communication system 190 that operates with beamforming. The communication system 190 includes a transceiver 195, signal conditioning circuits 194a1, 194a2 . . . 194an, 194b1, 194b2 . . . 194bn, 194m1, 194m2 . . . 194mn, and an antenna array 192 that includes antenna elements 193a1, 193a2 . . . 193an, 193b1, 193b2 . . . 193bn, 193m1, 193m2 . . . 193mn.

Communications systems that communicate using millimeter wave carriers (for instance, 30 GHz to 300 GHz), centimeter wave carriers (for instance, 3 GHz to 30 GHz), and/or other frequency carriers can employ an antenna array to provide beam formation and directivity for transmission and/or reception of signals.

For example, in the illustrated embodiment, the communication system 190 includes an array 192 of m×n antenna elements, which are each controlled by a separate signal conditioning circuit, in this embodiment. The array 192 can be similar to the array 150 described above in FIGS. 12-13. As indicated by the ellipses, the communication system 190 can be implemented with any suitable number of antenna elements and signal conditioning circuits.

With respect to signal transmission, the signal conditioning circuits can provide transmit signals to the antenna array 192 such that signals radiated from the antenna elements combine using constructive and destructive interference to generate an aggregate transmit signal exhibiting beam-like qualities with more signal strength propagating in a given direction away from the antenna array 192.

In the context of signal reception, the signal conditioning circuits process the received signals (for instance, by separately controlling received signal phases) such that more signal energy is received when the signal is arriving at the antenna array 192 from a particular direction. Accordingly, the communication system 190 also provides directivity for reception of signals.

The relative concentration of signal energy into a transmit beam or a receive beam can be enhanced by increasing the size of the array. For example, with more signal energy focused into a transmit beam, the signal is able to propagate for a longer range while providing sufficient signal level for RF communications. For instance, a signal with a large proportion of signal energy focused into the transmit beam can exhibit high effective isotropic radiated power (EIRP).

In the illustrated embodiment, the transceiver 195 provides transmit signals to the signal conditioning circuits and processes signals received from the signal conditioning circuits. As shown in FIG. 15, the transceiver 195 generates control signals for the signal conditioning circuits. The control signals can be used for a variety of functions, such as controlling the phase of transmitted or received signals to control beam forming.

Figure 16:
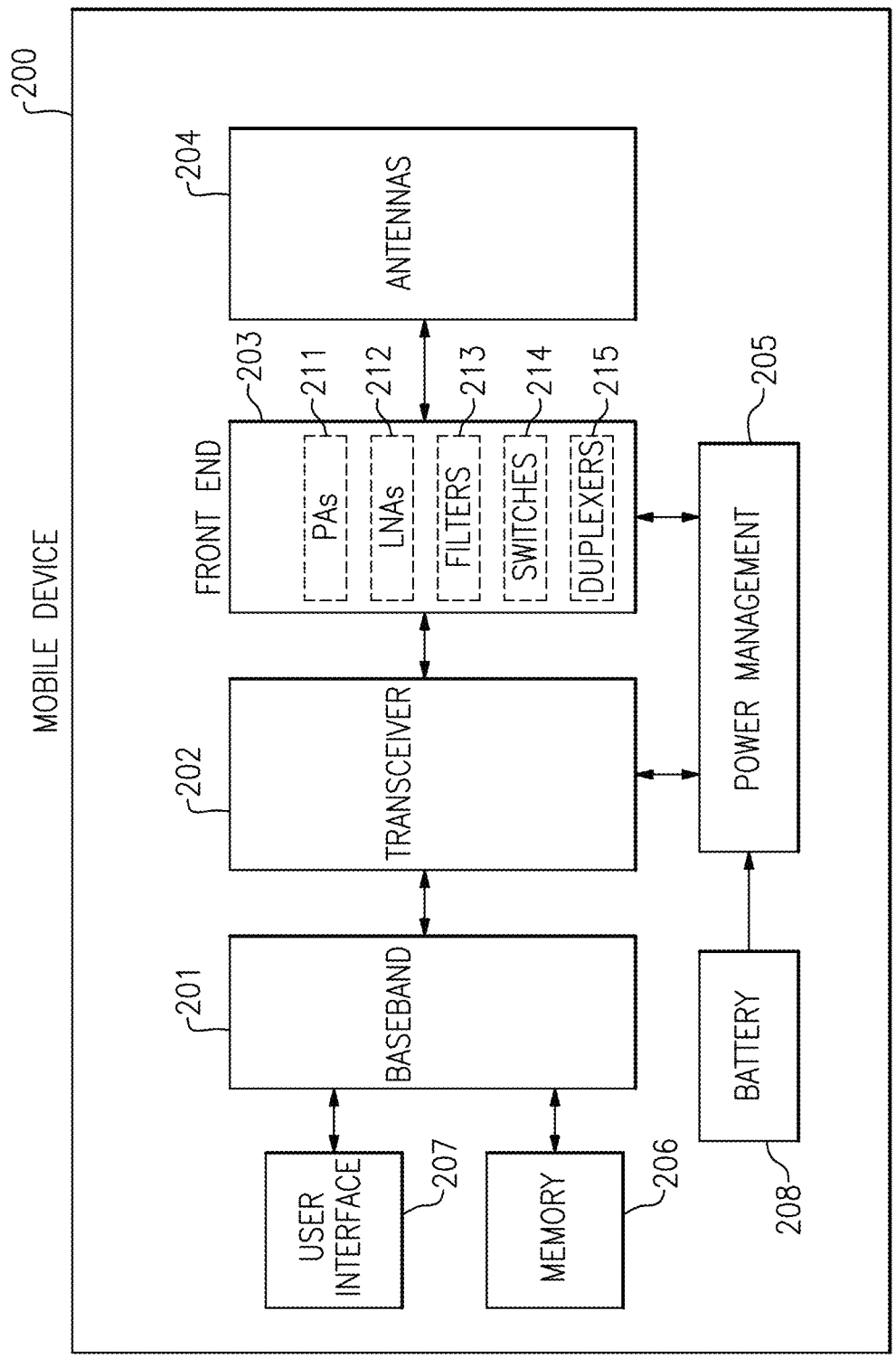
FIG. 16 is a schematic diagram of one embodiment of a mobile device.

FIG. 16 is a schematic diagram of one example of a mobile device 200. The mobile device 200 includes a baseband system 201, a transceiver 202, a front end system 203, antennas 204, a power management system 205, a memory 206, a user interface 207, and a battery 208.

The mobile device 200 can be used communicate using a wide variety of communications technologies, including, but not limited to, 2G, 3G, 4G (including LTE, LTE-Advanced, and LTE-Advanced Pro), 5G NR, WLAN (for instance, Wi-Fi), WPAN (for instance, Bluetooth and ZigBee), WMAN (for instance, WiMax), and/or GPS technologies.

The transceiver 202 generates RF signals for transmission and processes incoming RF signals received from the antennas 204. It will be understood that various functionalities associated with the transmission and receiving of RF signals can be achieved by one or more components that are collectively represented in FIG. 16 as the transceiver 202. In one example, separate components (for instance, separate circuits or dies) can be provided for handling certain types of RF signals.

The front end system 203 aids is conditioning signals transmitted to and/or received from the antennas 204. In the illustrated embodiment, the front end system 203 includes power amplifiers (PAs) 211, low noise amplifiers (LNAs) 212, filters 213, switches 214, and duplexers 215. However, other implementations are possible.

For example, the front end system 203 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 200 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 204 can include antennas used for a wide variety of types of communications. For example, the antennas 204 can include antennas for transmitting and/or receiving signals associated with a wide variety of frequencies and communications standards. The antennas 204 can be any antennas described herein, such as the end-fire antennas 100, 325, planar antennas 370, or a combination of antenna types.

In certain implementations, the antennas 204 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 200 can operate with beamforming in certain implementations. For example, the front end system 203 can include phase shifters having variable phase controlled by the transceiver 202. Additionally, the phase shifters are controlled to provide beam formation and directivity for transmission and/or reception of signals using the antennas 204. For example, in the context of signal transmission, the phases of the transmit signals provided to the antennas 204 are controlled such that radiated signals from the antennas 204 combine using constructive and destructive interference to generate an aggregate transmit signal exhibiting beam-like qualities with more signal strength propagating in a given direction. In the context of signal reception, the phases are controlled such that more signal energy is received when the signal is arriving to the antennas 204 from a particular direction. In certain implementations, the antennas 204 include one or more arrays of antenna elements to enhance beamforming.

The baseband system 201 is coupled to the user interface 207 to facilitate processing of various user input and output (I/O), such as voice and data. The baseband system 201 provides the transceiver 202 with digital representations of transmit signals, which the transceiver 202 processes to generate RF signals for transmission. The baseband system 201 also processes digital representations of received signals provided by the transceiver 202. As shown in FIG. 16, the baseband system 201 is coupled to the memory 206 of facilitate operation of the mobile device 200.

The memory 206 can be used for a wide variety of purposes, such as storing data and/or instructions to facilitate the operation of the mobile device 200 and/or to provide storage of user information.

The power management system 205 provides a number of power management functions of the mobile device 200. In certain implementations, the power management system 205 includes a PA supply control circuit that controls the supply voltages of the power amplifiers 211. For example, the power management system 205 can be configured to change the supply voltage(s) provided to one or more of the power amplifiers 211 to improve efficiency, such as power added efficiency (PAE).

As shown in FIG. 16, the power management system 205 receives a battery voltage from the battery 208. The battery 208 can be any suitable battery for use in the mobile device 200, including, for example, a lithium-ion battery.

Antenna Structure

Figure 17:
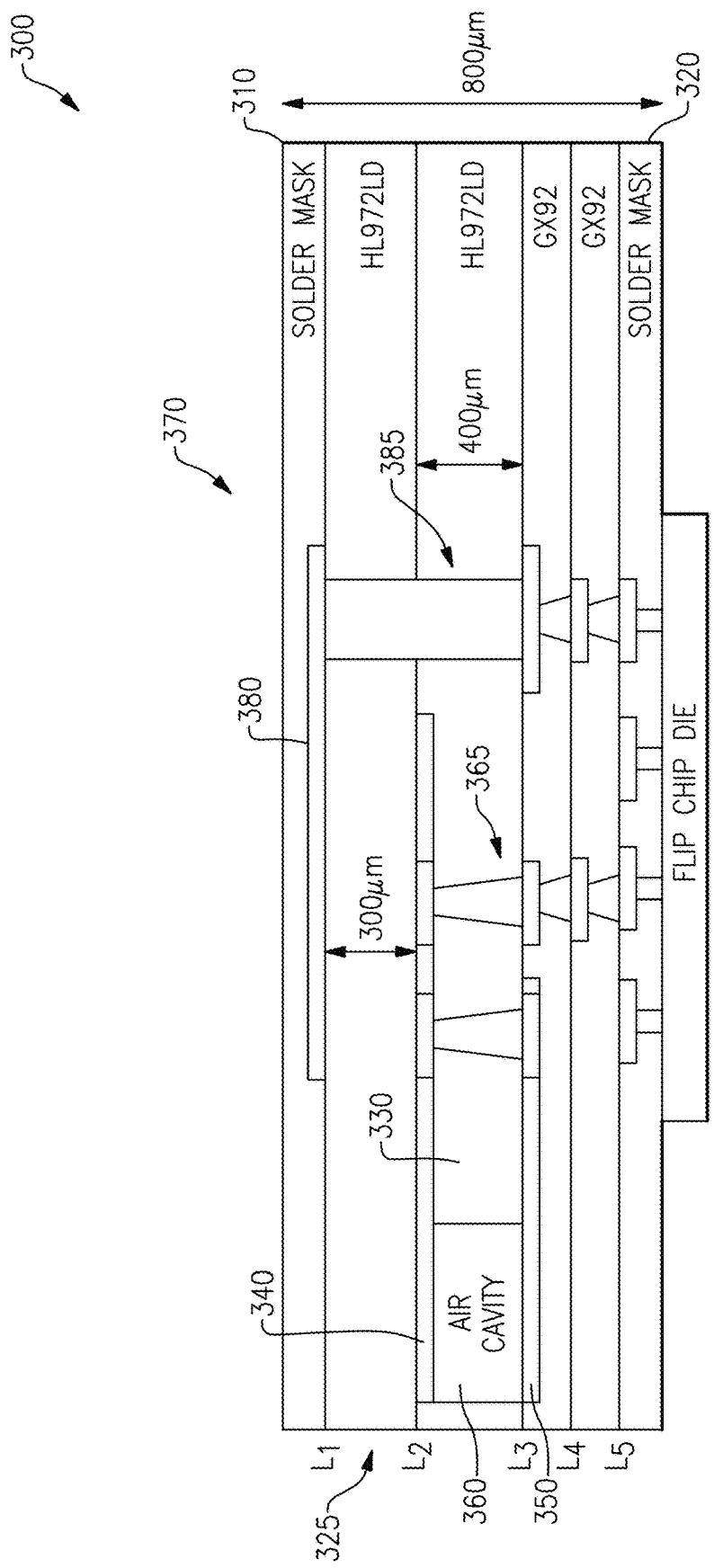
FIG. 17 shows a schematic cross-sectional view of a semiconductor device incorporating multiple antennae.

FIG. 17 shows one embodiment of a semiconductor device 300. In the illustrated embodiment, the semiconductor device 300 is a flip chip die 300 with multiple layers L1-L5 (e.g., of substrate material) connected by vias. A top layer 310 and a bottom layer 320 can include a solder mask. The die 300 can optionally include an antenna 325 (similar to the end-fire antenna 100 described above). The antenna 325 can include a dielectric layer 330 between metal layers 340, 350, and a cavity 360 (e.g., unfilled or filled with air) defined in the dielectric layer 330. The cavity 360 can be formed in the same manner as the cavity 108 described above. The antenna 325 can connected to a ground plane by vias 365. The antenna 325 can function in a similar manner as the antenna 100 described above, and can radiate laterally (e.g., to the left in FIG. 17).

With continued reference to FIG. 17, the die 300 can also optionally include a planar antenna 370 with a flat metal layer 380 that is spaced from the metal later 340 and connected to a ground plane by vias 385. In one embodiment, the planar antenna 370 can be a patch antenna. In another embodiment, the planar antenna 370 can be any planar antenna (e.g., with broadside radiation pattern, such as loop, planar inverted F antenna, etc.). The planar antenna 370 can radiate upward (e.g., in the upward direction as in FIG. 17). In the illustrated embodiment, the metal layers 340, 350 can be spaced apart by approximately 400 µm, the metal later 380 can be spaced from the metal later 340 by approximately 300 µm, and the die 300 can have a thickness T of approximately 800 µm. However, in other embodiments, other suitable values can be used. Advantageously, by incorporating the planar antenna 370 and the end-fire antenna 325, the die 300 allows for diversity of direction and antenna coverage in the die 300 (e.g., in a transceiver chip) to cover a greater area as compared with a die that only has one, but not both, of the planar antenna 370 and end fire antenna 325. In other embodiments, the die 300 can exclude the antenna 325 and simply have the planar antenna 370.

Figure 18:
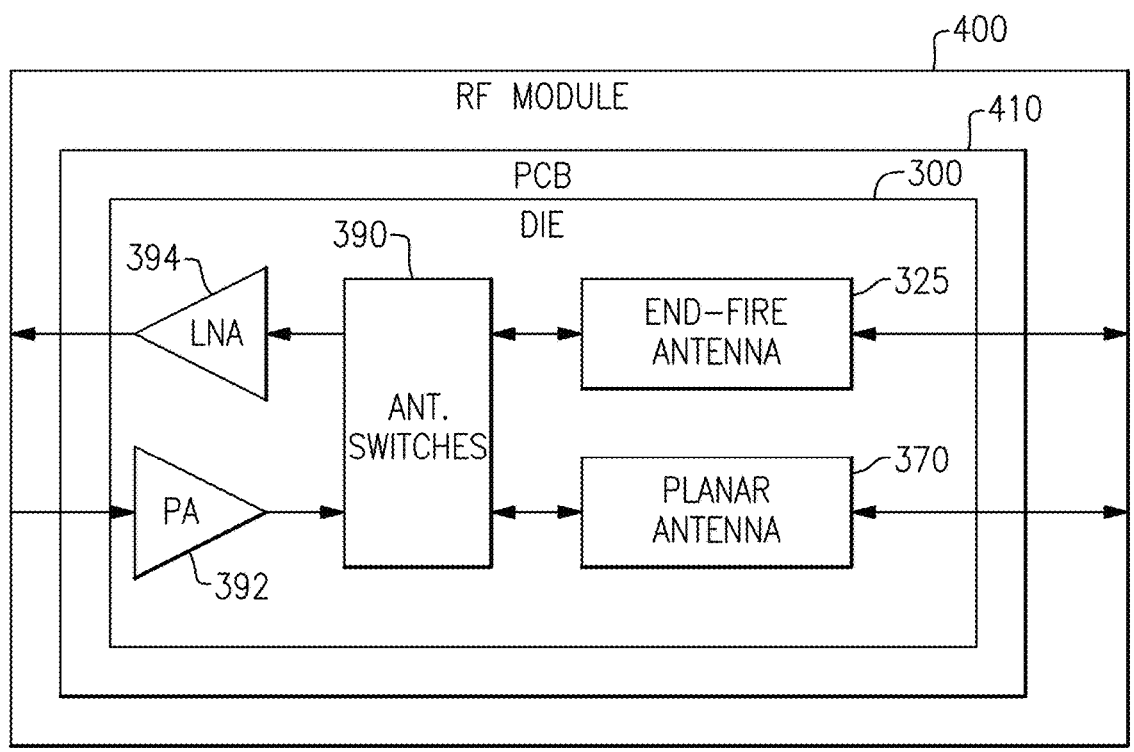
FIG. 18 shows a block diagram of a radio frequency module including the semiconductor device of FIG. 17.

The semiconductor device 300 can optionally be implemented in a radio frequency (RF) device or module 400, as shown in FIG. 18. The radio frequency device 400 can have a printed circuit board 410 to which the semiconductor device or die 300 can connect. The semiconductor device or die 300 can include an end-fire antenna, such as the antenna 325, 100, a planar antenna, such as the planar antenna 370, and additional componentry. For example, the semiconductor device 300 can have an antenna switch module 390 that can communicate with the end-fire antenna and planar antenna, an can also optionally have a power amplifier (PA) 392 and low noise amplifier (LNA) 394 that can communicate with the antenna switch module 390. The radio frequency device 400 can be a wireless device, a wire-based device, or some combination thereof.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. For example, one portion of one of the embodiments described herein can be substituted for another portion in another embodiment described herein. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. An end-fire antenna comprising:
    a first metal layer;
    a second metal layer;
    a dielectric layer disposed between the first and second metal layers; and
    an open cavity formed in the dielectric layer filled with air, the cavity defined by a pair of sidewalls that extend from an aperture of the cavity to a rear wall of the cavity, a depth of the cavity defined between the aperture and the rear wall, the side walls extending at an angle such that the cavity has a tapered shape defined by a taper angle between the side walls.

2. The end-fire antenna of claim 1 wherein a width of the aperture is greater than a width of the rear wall.

3. The end-fire antenna of claim 2 wherein the taper angle is between about 0 and 15 degrees.

4. The end-fire antenna of claim 3 wherein the taper angle is about 11 degrees.

5. The end-fire antenna of claim 1 wherein the cavity is rectangular and the sidewalls are generally parallel to each other.

6. The end-fire antenna of claim 1 wherein the antenna has a thickness of between about 100 microns and about 1 mm.

7. The end-fire antenna of claim 6 wherein the antenna has a thickness of between about 200 microns and about 400 microns.

8. The end-fire antenna of claim 7 wherein the antenna has a width of about 5 mm and a length of about 2.5 mm.

9. An antenna structure comprising:
    an array of a plurality of end-fire antennas, each antenna having a first metal layer, a second metal layer, a dielectric layer disposed between the first and second metal layers, and an open cavity formed in the dielectric layer filled with air, the cavity defined by a pair of sidewalls that extend from an aperture of the cavity to a rear wall of the cavity, a depth of the cavity defined between the aperture and the rear wall.

10. Then antenna structure of claim 9, wherein the plurality of end-fire antennas are arranged in a single row.

11. The antenna structure of claim 9 wherein the plurality of end-fire antennas are arranged in a plurality of rows and columns such that at least one of the antennas is stacked on another of the antennas.

12. The antenna structure of claim 11 wherein the array is a 2×2 array of antennas.

13. The antenna structure of claim 9 wherein the side walls extend at an angle and a width of the aperture is greater than a width of the rear wall, such that the cavity has a tapered shape defined by a taper angle between the side walls.

14. The antenna structure of claim 13 wherein the taper angle is between about 0 and 15 degrees.

15. A radiofrequency module comprising:
    a printed circuit board; and
    an end-fire antenna connected to the printed circuit board, the end-fire antenna defined by a dielectric layer disposed between a pair of metal layers and an open cavity formed in the dielectric layer filled with air, the cavity defined by a pair of sidewalls that extend from an aperture of the cavity to a rear wall of the cavity, a depth of the cavity defined between the aperture and the rear wall.

16. The radiofrequency module of claim 15 wherein the side walls extend at an angle and a width of the aperture is greater than a width of the rear wall, such that the cavity has a tapered shape defined by a taper angle between the side walls.

17. The radiofrequency module of claim 16 wherein the taper angle is between about 0 and 15 degrees.

18. The radiofrequency module of claim 17 wherein the taper angle is about 11 degrees.

19. The radiofrequency module of claim 15 wherein the cavity is rectangular and the sidewalls are generally parallel to each other.

20. The end-fire antenna of claim 15 wherein the antenna has a thickness of between about 100 microns and about 1 mm.

21. The radiofrequency module of claim 20 wherein the antenna has a thickness of between about 200 microns and about 400 microns.

22. The radiofrequency module of claim 15 wherein the antenna has a width of about 5 mm and a length of about 2.5 mm.

23. A wireless mobile device comprising:
    an end-fire antenna defined by a dielectric layer disposed between a pair of metal layers and an open cavity formed in the dielectric layer filled with air, the cavity defined by a pair of sidewalls that extend from an aperture of the cavity to a rear wall of the cavity, a depth of the cavity defined between the aperture and the rear wall.

24. The wireless mobile device of claim 23 wherein the side walls extend at an angle and a width of the aperture is greater than a width of the rear wall, such that the cavity has a tapered shape defined by a taper angle between the side walls.

25. The wireless mobile device of claim 24 wherein the taper angle is between about 0 and 15 degrees.

26. The wireless mobile device of claim 25 wherein the taper angle is about 11 degrees.

27. The wireless mobile device of claim 23 wherein the cavity is rectangular and the sidewalls are generally parallel to each other.

28. The end-fire antenna of claim 23 wherein the antenna has a thickness of between about 100 microns and about 1 mm.

29. The wireless mobile device of claim 28 wherein the antenna has a thickness of between about 200 microns and about 400 microns.

30. The wireless mobile device of claim 23 wherein the antenna has a width of about 5 mm and a length of about 2.5 mm.

* * * * *